United States Patent [19]

Yamashita et al.

[11] 4,437,168
[45] Mar. 13, 1984

[54] COMMUNICATION CONTROL UNIT

[75] Inventors: Masahide Yamashita; Hikaru Oku; Masato Maruyama, all of Yokosuka, Japan

[73] Assignee: Nippon Telegraph & Telephone Public Corp. of 1-6, Tokyo, Japan

[21] Appl. No.: 228,802

[22] Filed: Jan. 23, 1981

[30] Foreign Application Priority Data

Feb. 4, 1980 [JP] Japan .................................. 55-12171

[51] Int. Cl.³ .............................................. G06F 3/00
[52] U.S. Cl. .................................................. 364/900
[58] Field of Search ... 364/200 MS File, 900 MS File

[56] References Cited

U.S. PATENT DOCUMENTS

| | | | |
|---|---|---|---|
| 3,491,340 | 1/1970 | Richman et al. | 340/172.5 |
| 3,618,037 | 11/1971 | Wollum et al. | 340/172.5 |
| 3,639,909 | 2/1972 | Havck et al. | 340/172.5 |
| 3,699,525 | 10/1972 | Klavins | 340/172.5 |
| 3,725,871 | 4/1973 | Heuttner et al. | 340/172.5 |
| 3,842,405 | 10/1974 | Key et al. | 340/172.5 |
| 3,902,162 | 8/1975 | Parkinson et al. | 340/172.5 |
| 3,932,844 | 1/1976 | Yokoo | 340/172.5 |
| 4,011,544 | 3/1977 | Cherrey | 340/172.5 |
| 4,011,545 | 3/1977 | Nadir | 340/172.5 |
| 4,016,548 | 4/1977 | Law et al. | 340/172.5 |
| 4,047,159 | 9/1977 | Boudry | 364/900 |
| 4,075,691 | 2/1978 | Davis et al. | 364/200 |
| 4,079,452 | 3/1978 | Larson et al. | 364/200 |
| 4,125,872 | 11/1978 | Maxwell | 364/900 |
| 4,130,883 | 12/1978 | Hazelton | 364/900 |
| 4,195,351 | 3/1980 | Barner et al. | 364/900 |
| 4,213,178 | 7/1980 | Diez et al. | 364/200 |
| 4,286,319 | 8/1981 | Membrino et al. | 364/200 |
| 4,301,515 | 11/1981 | Fahey et al. | 364/900 |
| 4,310,720 | 1/1982 | Check, Jr. | 364/900 |
| 4,334,287 | 6/1982 | Wiedenman et al. | 364/900 |

Primary Examiner—Jerry Smith
Assistant Examiner—Gary V. Harkcom
Attorney, Agent, or Firm—Armstrong, Nikaido, Marmelstein & Kubovcik

[57] ABSTRACT

A real-time, on-line communication control unit is installed between a host computer and a plurality of terminals or between two host computers for the process of communication control. A plurality of basic processes relating to the communication control process are performed simultaneously by a corresponding plurality of basic processors which operate at the same time.

14 Claims, 31 Drawing Figures

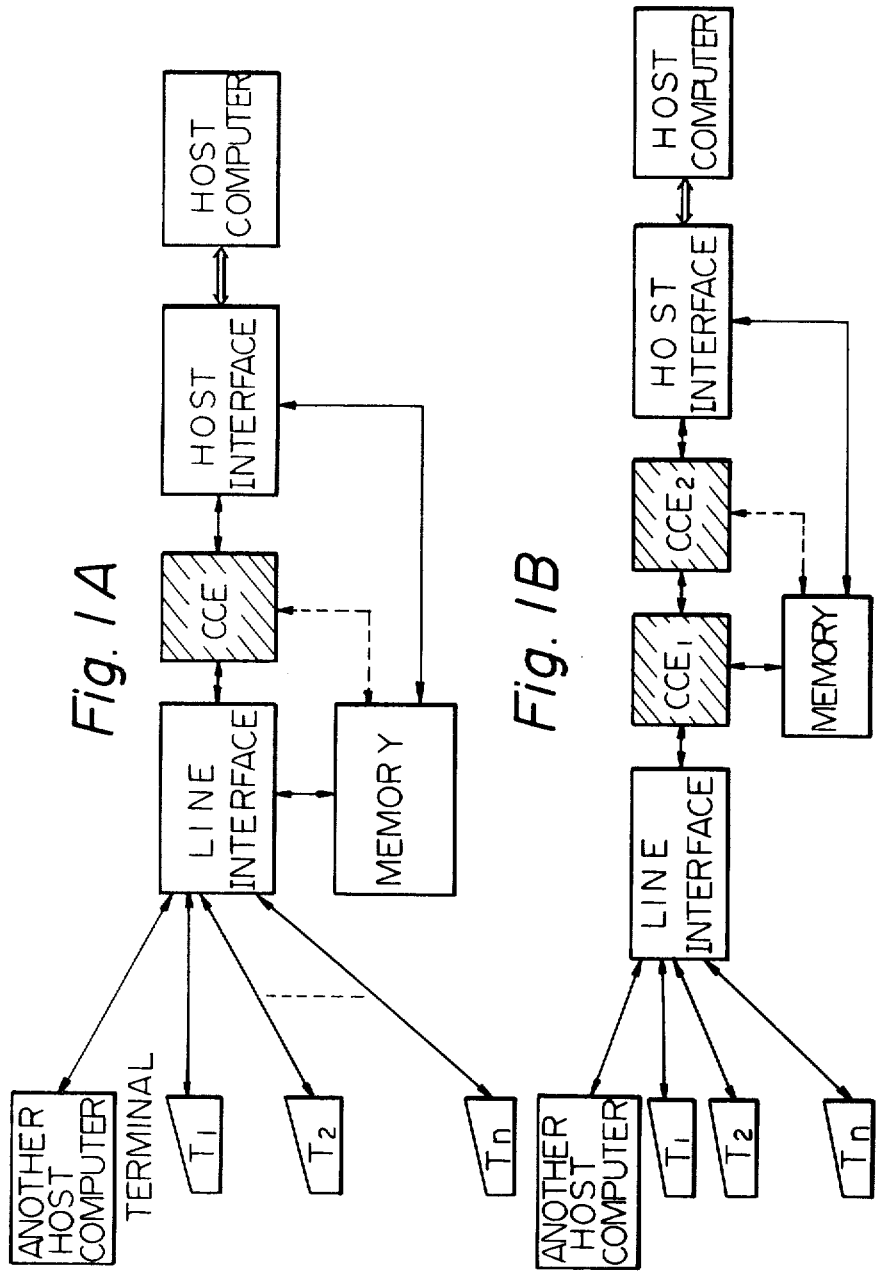

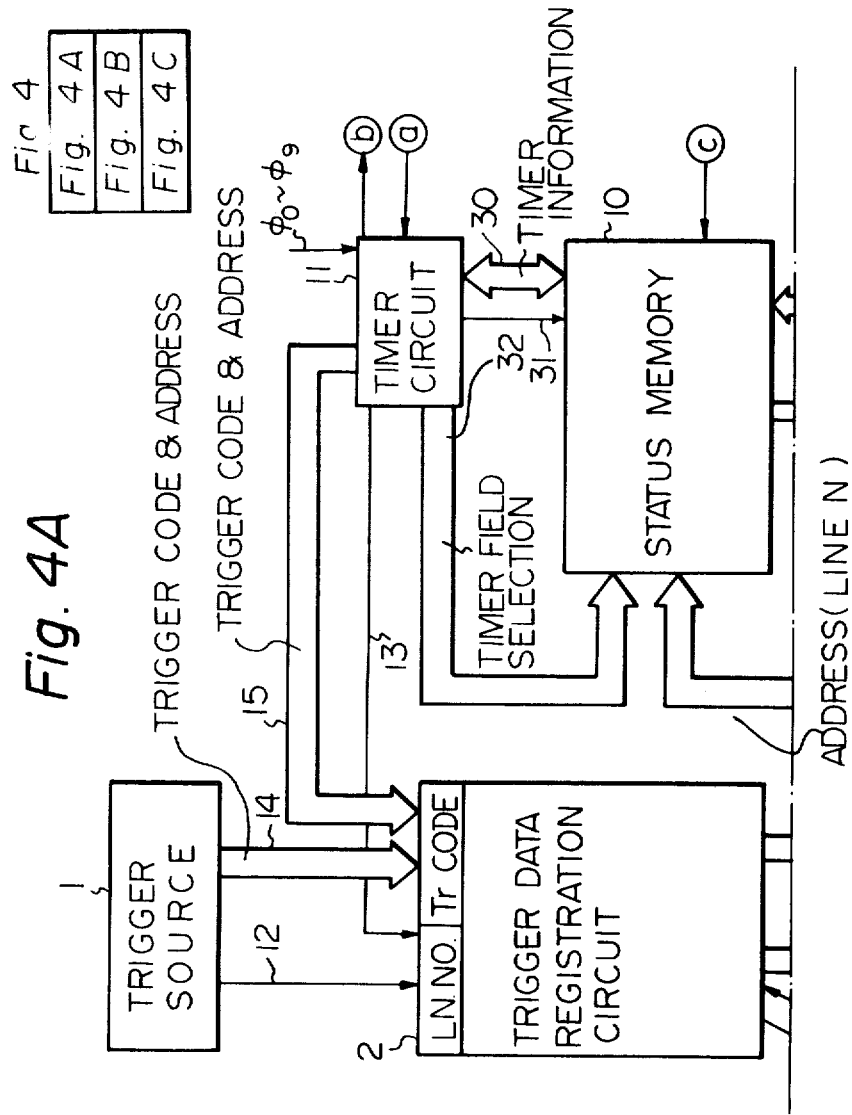

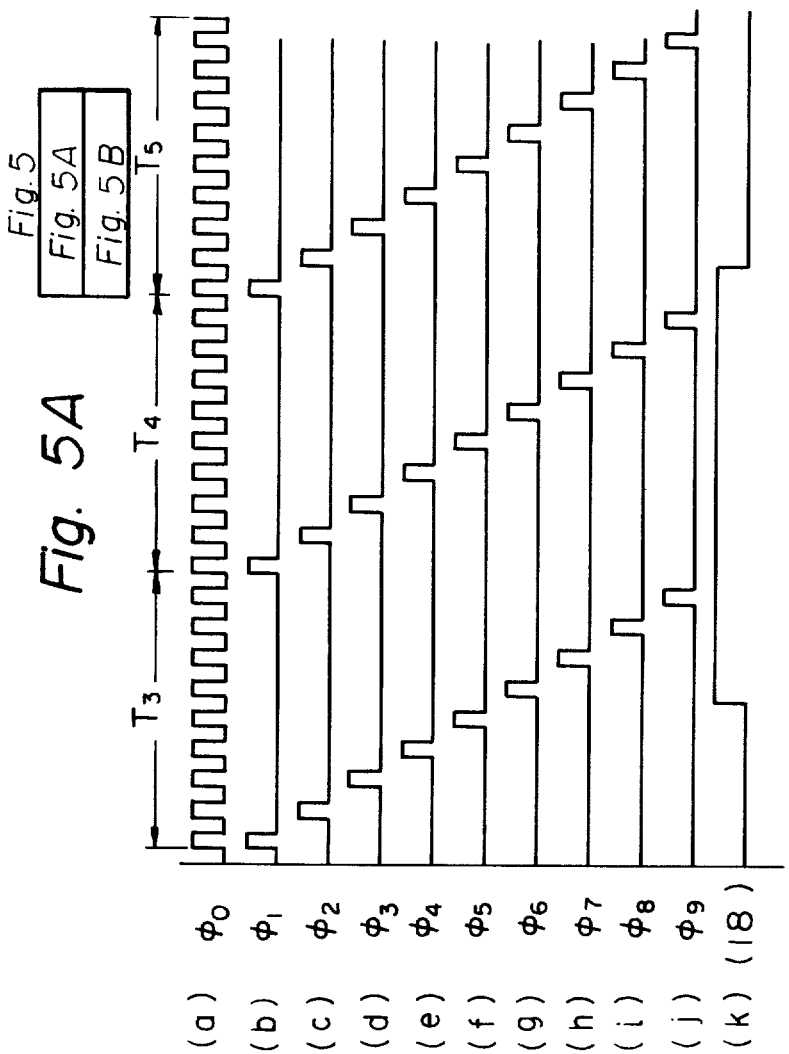

Fig. 7

| Fig. 7A | Fig. 7B |
|---|---|
| Fig. 7C | Fig. 7D |

Fig. 7A

| STATUS / SUB-STATUS / TRIGGER | (A) NEUTRAL STATUS | | (B) STATUS AFTER RECEPTION OF ENQ SEQUENCE | |
|---|---|---|---|---|
| | 01 | 00000 | 02 | OXOXO |
| RECEPTION OF AN ENQ SEQUENCE FROM A TERMINAL | 00 (A') | 00 | 01 | 01 |
| RECEPTION OF DATA FROM A TERMINAL | 01 (D') | 05 | 04 | 04 |

Fig. 7B

| | (C) STATUS THAT ACK RESPONSE IS BEING TRANSMITTED | (D) STATUS AFTER TRANSMITTING ENQ SEQUENCE | (E) STATUS AFTER RECEPTION OF DATA | (F) STATUS THAT NAK CODE IS BEING TRANSMITTED FOR THE RECEIVED DATA |
|---|---|---|---|---|
| | 03 XXOXO | 04 OXOXI:IXOXI | 05 OXOXI:OXIXI | 06 XXXXI |
| | 02 | 03 | 04 | 02 |
| | 02 | 06 | 04 | 02 |

Fig. 7C

| | | | |
|---|---|---|---|
| END CODE FROM A LINE INTERFACE | 02 (I') | 02 | 02 |
| INSTRUCTION FROM HOST COMPUTER TO SEND ACK CODE | 03 (E') | 09 | 0A |
| INSTRUCTION FROM HOST COMPUTER TO SEND NAK CODE | 04 | 09 | 0D |
| INSTRUCTION FROM HOST COMPUTER TO ESTABLISH A DOWNWARD DIRECTION DATA LINK (HOST→TERMINAL) | 05 | 10 | 09 |

| MEMORY ADDRESS / FIELD | A STATUS TRANSFER 8BITS | B NOTICE OF REPETITION TIMES OVER PREDETERMINED VALUE 2BITS | C TRANSMISSION SIDE ACK/NAK CODE CHANGE 2BITS | D RECEPTION SIDE ACK/NAK CODE CHANGE 2BITS | E TRANSMISSION DATA LINK ESTABLISHED 2BITS | F RECEPTION DATA LINK ESTABLISHED 2BITS | G FIRST COUNTER (U,V) CONTROL 2BITS |
|---|---|---|---|---|---|---|---|
| 0 0 | 0 2 | 0 | 0 | 0 | 0 | 0 | 0 |
| 0 1 | 0 0 | 0 | 0 | 0 | 0 | 0 | 0 |
| 0 2 | 0 7 | 0 | 0 | 0 | 0 | 0 | 0 |
| 0 3 | 0 2 | 2 | 0 | 0 | 0 | 2 | 2 |
| 0 4 | 0 C | 0 | 0 | 0 | 0 | 0 | 0 |
| 0 5 | 0 0 | 0 | 0 | 0 | 0 | 0 | 0 |
| 0 6 | 0 5 | 2 | 0 | 0 | 0 | 0 | 2 |
| 0 7 | 0 4 | 0 | 0 | 1 | 0 | 1 | 0 |
| 0 8 | 0 8 | 0 | 0 | 0 | 0 | 0 | 0 |
| 0 9 | 0 0 | 0 | 0 | 0 | 0 | 0 | 0 |
| 0 A | 0 3 | 0 | 0 | 0 | 0 | 0 | 0 |
| 0 B | 0 9 | 0 | 0 | 0 | 0 | 0 | 0 |
| 0 C | 0 9 | 0 | 0 | 0 | 0 | 0 | 0 |
| 0 D | 0 A | 0 | 0 | 0 | 0 | 0 | 0 |
| 0 E | 0 6 | 0 | 0 | 0 | 0 | 0 | 0 |
| 0 F | 0 6 | 0 | 0 | 0 | 0 | 0 | 0 |
| 1 0 | 0 B | 0 | 0 | 0 | 0 | 0 | 0 |

Fig. 8B

| SECOND COUNTER (W,X) CONTROL | TIMER(d) CONTROL | TIMER COUNTER SELECTION (Y,Z,a,b,c) | HOST COMPUTER REPORT CODE | LINE INTERFACE REPORT CODE | DATA LENGTH | START ADDRESS OF DATA IN WORKING MEMORY |
|---|---|---|---|---|---|---|
| H | I | J | K | L | M | N |
| 2 BITS | 2 BITS | 3 BITS | 8 BITS | 8 BITS | 8 BITS | 24 BITS |
| 0 | 0 | 0 | 01 | 00 | 00 | 000000 |
| 0 | 0 | 0 | 00 | 00 | 00 | 000000 |
| 0 | 0 | 0 | 03 | 00 | 00 | 000000 |
| 0 | 2 | 5 | 01 | 00 | 00 | 000000 |
| 0 | 0 | 0 | 02 | 00 | 00 | 000000 |
| 0 | 0 | 0 | 02 | 00 | 00 | 000000 |
| 0 | 2 | 5 | 05 | 00 | 00 | 000000 |
| 0 | 1 | 5 | 00 | 02 | 00 | 000000 |
| 0 | 1 | 5 | 00 | 02 | 00 | 000000 |
| 0 | 1 | 1 | 04 | 00 | 00 | 000000 |
| 0 | 1 | 1 | 00 | 01 | 02 | 010000 |
| 0 | 1 | 1 | 00 | 01 | 02 | 010000 |
| 0 | 1 | 1 | 00 | 01 | 02 | 020000 |
| 0 | 1 | 1 | 00 | 01 | 02 | 020000 |
| 0 | 1 | 1 | 00 | 01 | 02 | 020000 |
| 0 | 1 | 1 | 00 | 01 | 02 | 010000 |
| 0 | 1 | 1 | 00 | 01 | 00 | 000000 |

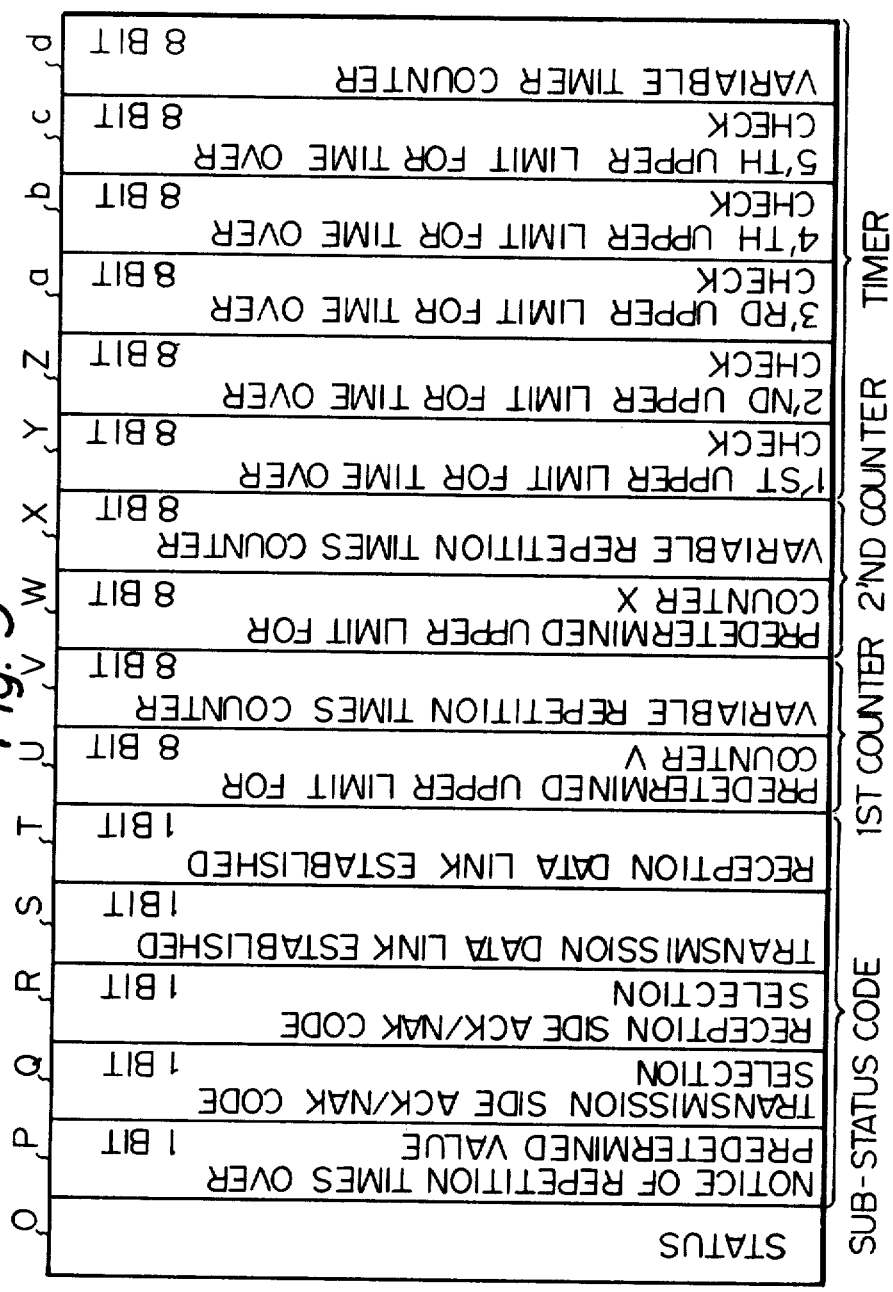

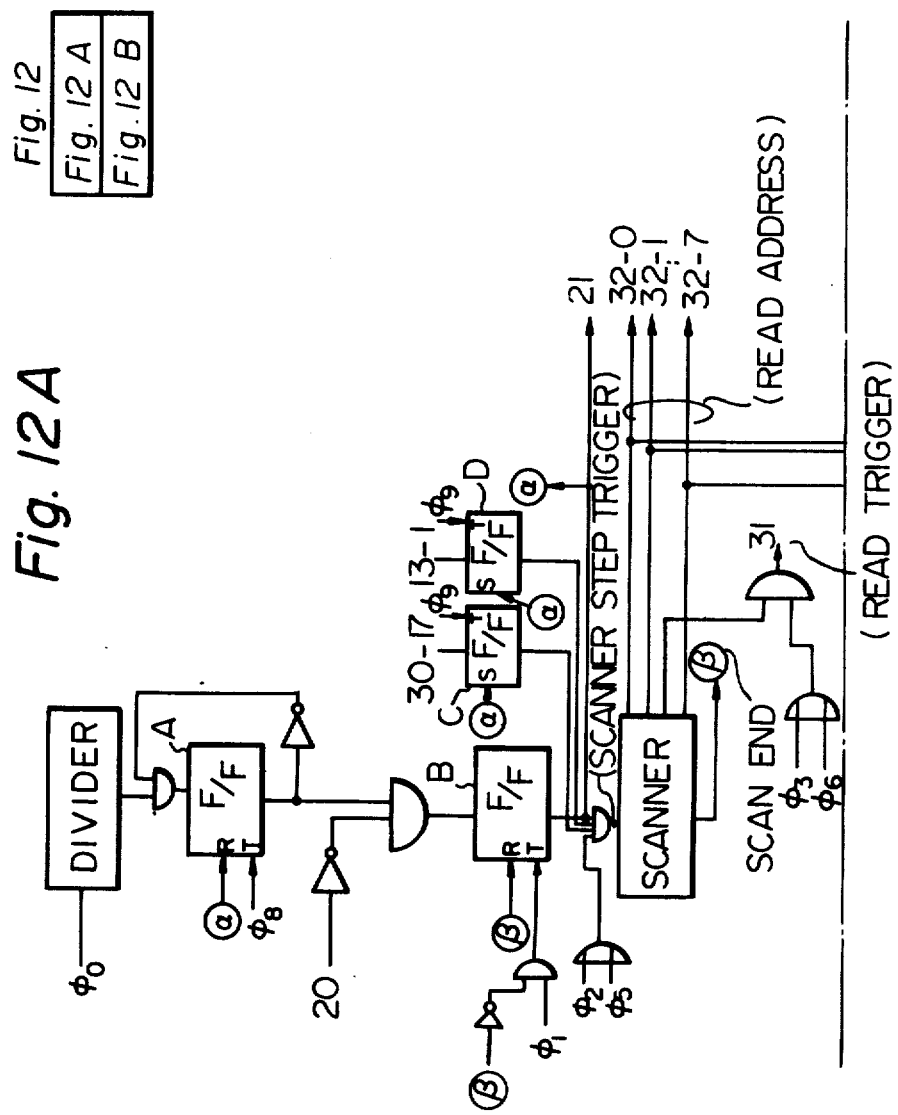

COMMUNICATION CONTROL UNIT

BACKGROUND OF THE INVENTION

In the field of computers, it is desirable to provide a communication control (herein referred to interchangeably as CCU in the specification and CCE in the drawings) for an on-line real-time computer system, and in particular, a control unit which has a plurality of processors that each executes basic processes of communication control functions to provide high speed operation, with simple structure, and the easy modification of an existing unit. To this end, it is desirable to provide a communication control unit that is installed between a host computer, which provides the data process and a plurality of terminals, another host computer, or communication lines which are connected to terminal equipment or another host computer. Some of the items which are handled by a communication control unit are to receive and transmit ACK/NAK code, to check the operation of terminals or a time-over condition or the change of status of the lines, to control a status of each lines, and to control the transfer of data between a host computer and lines. The function of a communication control unit is defined by a communication control procedure, like BASIC MODE CONTROL PROCEDURE issued as ISO 1745, ISO 2111, ISO 2628, ISO 2629 by ISO (the International Organization for Standardization), or HIGH LEVEL DATA LINK CONTROL PROCEDURE issued as ISO 3309, ISO 4335, DIS 6159, DIS 6256 by ISO.

FIG. 1A shows an example of a general diagram of a on-line real-time computer system, in which a plurality of terminal sets, or other host computers are connected to a host computer through a line interface, a communication control unit (CCU), and a host interface. Also, a buffer memory is installed to store temporarily the data transferred between the host computer and terminals or other host computers. A line interface functions to convert serial data to parallel data or vice versa, to assemble or disassemble between characters and data block, to check the format of a block, to report the abnormality of a line to the CCU to report the reception of a block to the CCU to transmit an end code to CCE when a control code from that unit has been received and the operation for the control code has been finished. A communication control unit (CCU) functions to process the communication control procedure as mentioned before. The actual data processed by said line interface or a communication control unit is stored in a buffer memory. Thus, a host computer is connected to a plurality of terminals or communication lines through a line interface, a communication control unit, a host interface, and a buffer memory, and a host computer can get rid of the job which relates to handling terminals or lines.

Alternatively, some of the functions of a line interface is shared by a first communication control unit (CCE$_1$) as shown in FIG. 1B. In that case, a line interface functions merely to convert serial data to parallel data or vice versa, to monitor the change of the status of the lines, to control the lines, and the first communication control unit functions to assemble or disassemble between characters and a block, and to return an end code to a second communication control equipment (CCU$_2$), which functions according to the communication control procedure as mentioned before.

A conventional communication control unit utilizes a program controlled system, which performs machine instructions one after another in time sequence or a wired logic system. The IBM model 3704, 3705-I and 3705-II communication controllers are examples of the former, and the IBM models 2703 and 2704 communication controllers are examples of the latter.

The program controlled communication control unit is further sorted to a machine instruction model and a micro program model which does not have a machine instruction. A machine instruction model has the advantage that the structure is simple and the amount of hardware is small, but has the disadvantages that it takes a long time to process a job because of a time sequence operation, large amount of memories are necessary for storing the program for operating the machine instructions, and that it takes a long time to debug and test a program. Further, that machine instruction model has the disadvantage that the number of communication lines or terminals handled by a CCU is restricted because of the decrease of a throughput due to the increase of the dynamic steps in program execution. A micro-program model has the similar disadvantages to those of machine instruction model. Also, the productivity of a micro-program model is wrong. Further, a wired logic model has the disadvantages that a large amount of hardware is necessary, and the modification and/or the change of the unit is almost impossible; thus, the unit can not follow the change of the communication control procedure, although that wired logic model has the advantage that the processing ability is large.

Accordingly, when the data transmission speed is slow, for example less than 48 Kbit/sec", a prior communication control unit can handle that terminal or line. However, when the data transmission speed is high, for example higher than 1 Mbit/sec" utilizing high speed satellite traffic channels, such prior art is amost useless.

OBJECTS OF THE INVENTION

It is an object, therefore, of the present invention to overcome the disadvantages and limitations of prior communication control units by providing a new and improved communication control unit having a plurality of processors that each executes basic processes of communication control functions simultaneously.

It is also an object of the present invention to provide a communication control unit having a plurality of processors that each executes basic processes of communication control functions simultaneously and which is simple in structure, can handle many high speed data communication lines or terminals, and is flexible to the modification and/or the extension of the functions of the unit and/or the communication control procedure.

SUMMARY OF THE INVENTION

The principle concept of the present invention is the presence of a plurality of basic processors which operate simultaneously, responding to the trigger code from an external circuit or a timer circuit, and the instantaneous status code (control phase) of the communication lines or the terminals.

According to the preferred embodiment the present invention provides a communication control unit connected to a host computer and a plurality of terminals, or between two host computers through communication lines, including related lines having interfaces and basic processes for communication control procedures and situations which comprise a status memory 10. The status memory 10 has a plurality of fields for each line. The fields include at least an instantaneous status of the communication lines, information of whether a transmission data link or a reception data link has been established between the host computer and the terminals or between two host computers, a count data of the repetition times of each basic process of the communication control procedures, a predetermined upper limit value of repetition times of each basic process, a transient count data of timer pulse count fields for a timer circuit's checking of the predetermined time period values, and a predetermined time period value.

A timer circuit 11 is provided for updating the content of the timer pulse count fields in the status memory 10 in every predetermined time period value, and provides trigger data when the content of the timer pulse count fields reaches a prdetermined value in the status memory 10.

A trigger data registration circuit 2 is provided for storing a set of information, including trigger data comprising a trigger code and a line number, the trigger data being provided from the host computer, the lines and the timer circuit 11 according to the kind of trigger data.

A status transfer logic 5 is included for providing a predetermined operation code responding to the combination of the present status code in the status memory 10 relating to the line indicated by trigger data and the trigger code in the trigger data provided by the trigger data registration circuit 2.

A memory 6 has a fixed table for decoding the output of the status transfer logic 5 and provides an operation code for each field relating to the status memory 10.

Finally, a plurality of basic processors operates each basic process of the communication control procedure according to the related field of the operation code provided from the memory 6 and the output of the status memory 10 and provides for the outputs to be applied to the status memory 10, the host computer and the related line interface, and the plurality of basic processors operate simultaneously with one another.

BRIEF DESCRIPTION OF THE DRAWINGS

The foregoing and other objects, features, and attendant advantages of the present invention will be highly appreciated as the same become better understood by means of the following description and accompanying drawings wherein;

FIG. 1A and FIG. 1B show the basic concepts of the data communication system between a host computer and a plurality of terminals utilizing a communication control unit.

FIG. 5, comprising FIGS. 5A and 5B, shows the operational timing sequence of the control unit of FIGS. 4-4C;

FIG. 7, comprising FIGS. 7A, 7B, 7C and 7D, shows the example of the status transfer logic 5 in FIGS. 4-4C (also FIG. 8 comprises FIGS. 8A and 8B);

FIG. 8A, along with FIG. 8B, shows the example of the content of the memory 6 in FIG. 4C;

FIG. 9 shows the format of the status memory 10 for each line in FIGS. 4-4C;

DESCRIPTION OF THE PREFERRED EMBODIMENTS

Figure 2A:
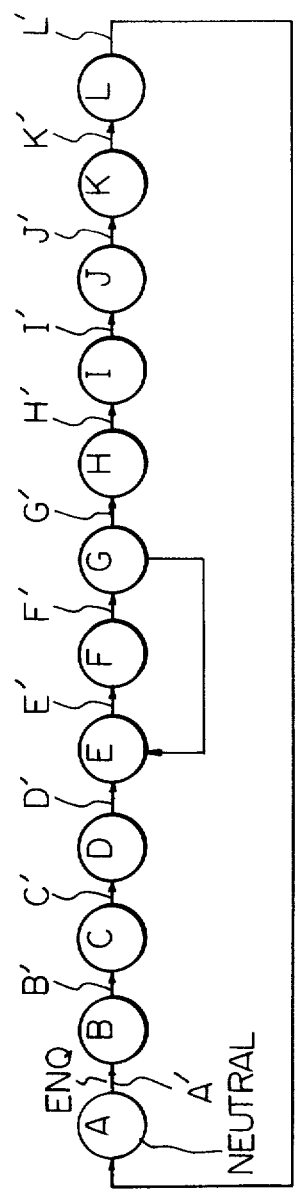
FIG. 2A and FIG. 2B show the brief status transfer diagram of data communication for the explanation of the concept of the present invention.
Figure 2B:
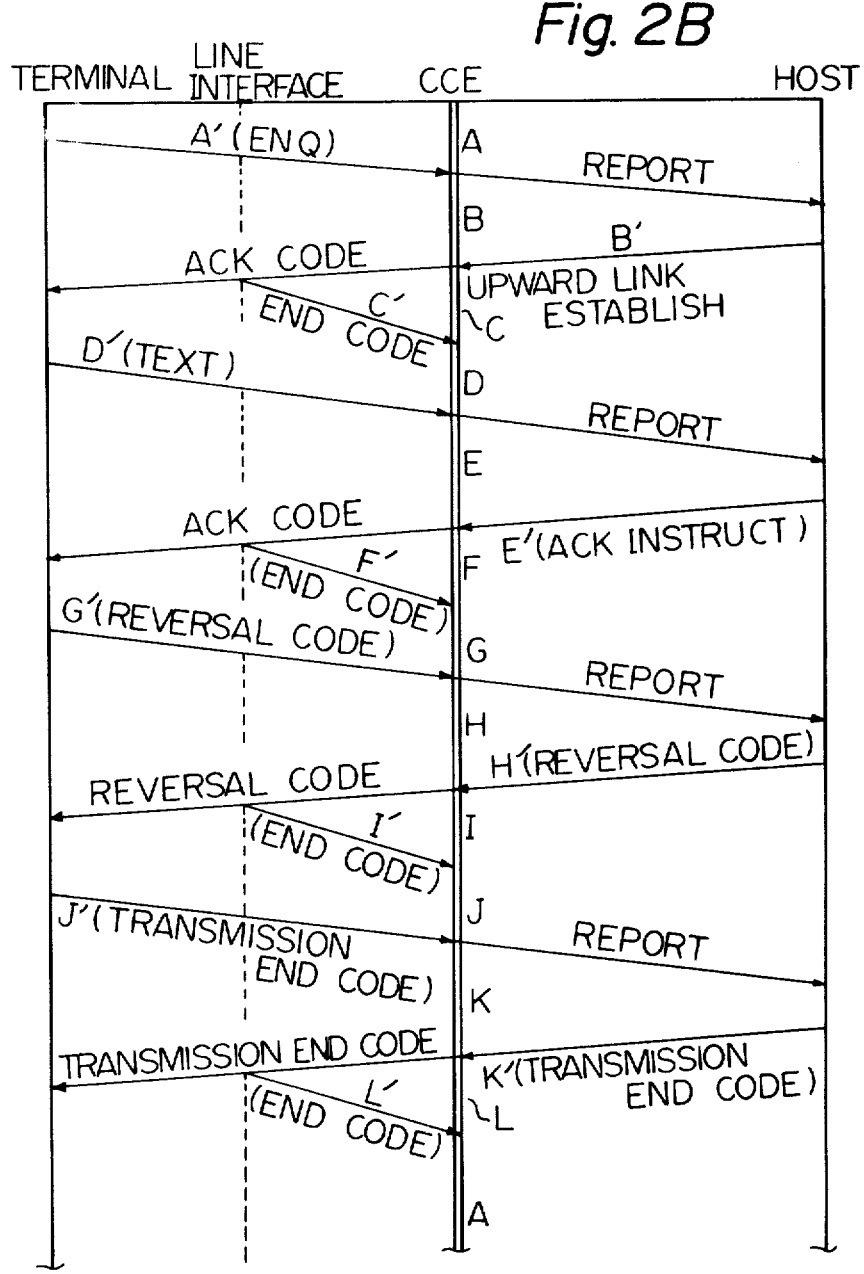
Figure 3:
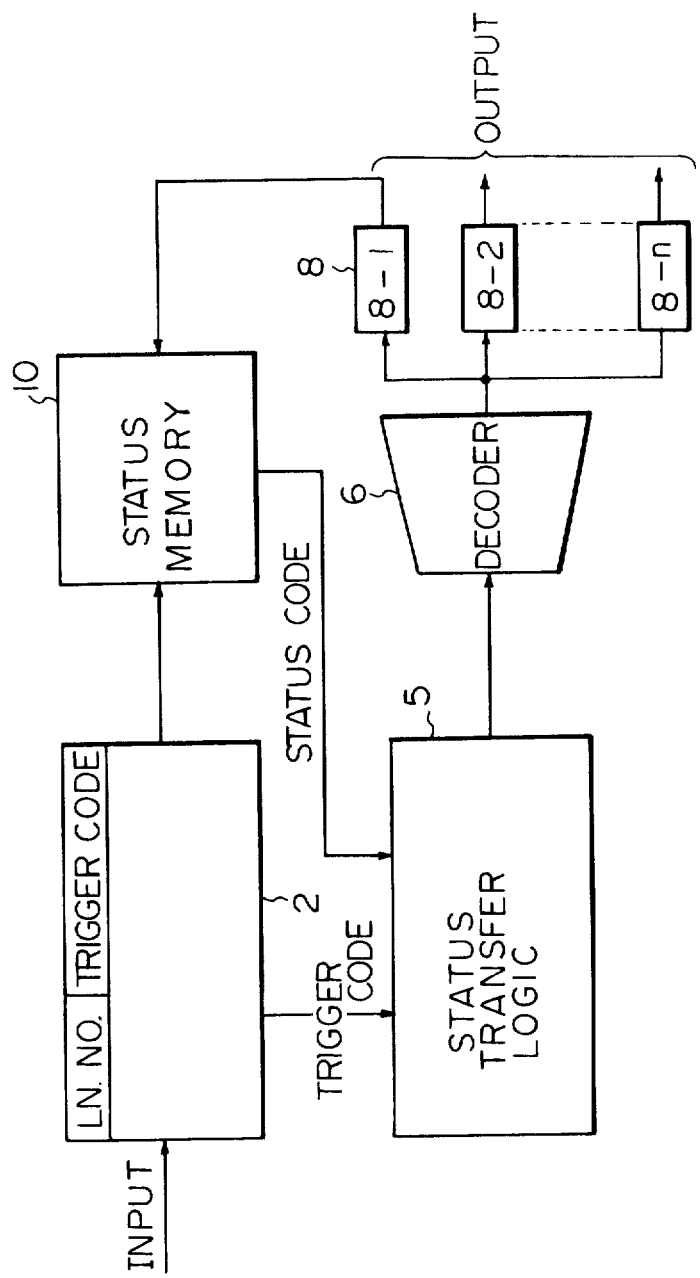
FIG. 3 is the brief block diagram of the present communication control unit, FIG. 4 comprises FIGS. 4A, 4B and 4C and is a detailed block diagram of the present communication control unit.

First, the simplified model of the present invention is explained in accordance with FIGS. 2A, 2B and 3 for the easy understanding of the present invention, and next, the detailed embodiment is described in accordance with FIGS. 4 through 12.

In the following explanation, it is supposed that a communication control unit is utilized as shown in FIG. 1A, and the communication control unit performs the control of a half duplex basic mode control procedure communication between terminals and the host computer. In the half duplex basic mode control procedure communication system, each terminal can transmit data to a host computer, and a host computer can transmit data to a terminal alternately, but a host computer and a terminal can not transmit data simultaneously by a single line. That is to say, a terminal and a host computer can not transmit data unless a signal is received.

A text or data transmitted between terminals and a host computer can be in any format. In a Basic Mode Control Procedure by ISO 1745, a text is sandwiched by STX(start of text) code or SOH(start of heading), code and ETX(end of text) code. Sometimes a BCC (block check code) code follows the ETX code for the purpose of error check. When a text is long, the text is divided to a plurality of blocks, and each block is sandwiched by STX code and ETB(end of transmission block) code. In the High Level Data Link Control Procedure by ISO 3309, the full text has the frame pattern(01111110), the address pattern, the control pattern, the text to be transmitted, the FCS(frame check sequence) pattern for the purpose of error check, and the frame pattern (01111110). The present invention can handle not only the above two formats, but also any other formats of a text. Further, the present invention can handle not only the above mentioned half duplex communication system, but also any other communication systems like the full duplex communication system and/or other half duplex communication systems.

The concepts of a status, a status transfer or a status change, and a trigger are the most important concepts in the present invention. So, those concepts are explained in accordance with FIGS. 2A and 2B. in those figures, the statuses A through L show the particular conditions of each line and a status changes to the next status as shown by an arrow in FIG. 2A upon receipt of a trigger. An arrow of FIG. 2A which initiates the change of a status is called a "Trigger". The status diagram of FIGS. 2A and 2B is not the actual one, but is merely a model for the purpose of the explanation. In FIGS. 2A and 2B, each status A through L have the following meaning.

A; Neutral status
B; Status after reception of ENQ sequence
C; Status that ACK code is being transmitted
D; Status after transmitting ACK code E; Status after reception of data
F; Status that ACK code is being transmitted
G; Status after transmitting ACK code
H; Status after reception of reversal code (relinquish right to transmit)
I; Status that a reversal code is being transmitted
J; Status after transmission of a reversal code
K; Status after reception of a transmission end code
L; Status that a transmission end code is being transmitted Also, the triggers A' through L' which initiate the change of a status have the following meaning.

A'; reception of an ENQ sequence from a terminal
B'; an instruction from a host computer stating the establishment of a data link from a terminal or another host to the host computer
C'; end code from a line interface
D'; reception of data from a terminal
E'; instruction from a host computer to send ACK code
F'; end code from a line interface
G'; reception of reversal code from a terminal
H'; instruction from a host computer to send reversal code
I'; end code from a line interface
J'; reception of transmission end code from a terminal
K'; instruction from a host computer to send a transmission end code
L'; end code from a line interface In FIGS. 2A and 2B, it is supposed that the particular line or the terminal is idle or free, and the CCU designates the status A to that circuit. When the terminal at the extreme end of that line desires to transmit data to the host computer, that terminal sends first the ENQ sequence to the host computer through the CCU. When the CCU receives that ENQ sequence (trigger A') CCU reports the reception of the ENQ sequence to the host computer and changes the status from A to B. Then the host computer instructs the CCU to establish the upward data link from the terminal to the host computer(-trigger B'). The CCU sends the ACK code which is the reply to the ENQ sequence stating that the host computer is ready to receive data, and changes the status from B to C. When that ACK code has been sent, the line interface returns the end code(trigger C') to the CCU then the CCU changes the status from C to D. As the data link has been established and the terminal has been acknowledged by the host computer, the terminal begins to send data which has STX character, a text, and ETX character or ETB character (trigger D'). When the CCU receives the data, the CCU reports the same to the host computer, and changes the status from D to E. When the data transmission from the terminal has finished and all the data has been received without error, the host computer sends the acknowledgment instruction code to the CCU (trigger E') to transmit the ACK code. Then, the CCU sends the ACK code to the terminal advising that all the data from the terminal has been received without error, and changes the status from E to F. When that ACK code has been sent, the line interface returns the end code(trigger F') to the CCU, then the status is changed from F to G. When there are a plurality of blocks to be transmitted from the terminal to the host computer, the statuses E,F and G are repeated as shown by the small loop in FIG. 2A.

When the terminal has sent all the data to the host computer, the terminal sends the reversal code(trigger G').

The reversal code from the terminal means that all the data from the terminal has been sent, and the terminal is ready to receive the data from the host computer. That reversal code is utilized because of the half duplex basic mode control procedure communication system which transmits data alternately. Upon reception of the reversal code(trigger G'), the CCU reports the same to the host computer, and changes the status from G to H. If the host computer has no data to be transmitted to that terminal, the host computer instructs the CCU to send the same reversal code(trigger H'). Then, the CCU sends the reversal code to the terminal and changes the status from H to I. When that reversal code has been sent, the line interface returns the end code (trigger I') to the CCU, and the status is changed from I to J. When the terminal receives that reversal code, the terminal beings to terminate the transmission by transmitting the transmission end code(trigger J'). The CCE reports reception of the transmission end code to the host computer, and changes the status from J to K. The host computer, then, instructs the termination of transmission by transmitting the transmission end code(trigger K'). Then the CCU transmits the transmission end code to the terminal and changes the status from K to L. The line interface returns the end code to the CCU when that transmission end code has been sent (trigger L'), and the data link is closed, thus, the status in the CCU for that line returns to the initial neutral status A.

As apparent from the above explanation, the operations of the communication control unit (CCU) are to change the status of each line, to transmit data or information to the host computer and/or a terminal, and/or to monitor the time out condition which is the condition that the expected response is not received within the predetermined duration. And, the change of the status occurs when a trigger data is received. The trigger data is generated either in a line interface or a host computer, and also that trigger data is generated within a communication control unit (CCU) when the time out condition occurs. Thus, the operation of the CCU is simple in each line, however, since the CCU must handle many lines at the same time even when the data transmission speed of a line is very high, the operational speed of the CCU must be very high.

FIG. 3 shows the basic brief block diagram of the communication control unit (CCU) according to the present invention, in which the reference numeral 2 is a trigger data registration circuit which is implemented by a first-in-first-out(FIFO) memory storing a trigger data having the line number and a trigger code(one of A' through L' in FIG. 2A). The inputs of that registration circuit 2 are provided by line interface, a host computer, and the communication control unit itself in case of the time out condition. When a trigger data occurs, the trigger data is listed in the circuit 2 with the line number and the trigger code. The reference numeral 5 in FIG. 3 is a status transfer logic which receives the trigger code from the registration circuit 2 and the instantaneous status from the status memory 10. The status transfer logic 5 determines what operation the CCU should perform upon receipt of the trigger code in the particular status. The logic 5 is shown in the table 1 as an example, in which the CCU performs the operation (01) upon receipt of the first trigger code(1) in the status A. If the second trigger code appears in the status B, the CCU performs the operation(02). The status transfer logic 5 is implemented either by a table memory, or by the combination of AND circuits, OR circuits and NOT circuits. The decoder 6 decodes the operation code provided by the logic 5, that is to say, each operation code in the table 1 is composed of some of the basic processes as shown in the table 2. In the table 2, the operation(10) is the combination of the basic processes d,e, and f, and the operation(02) is the combination of the basic processes b,d,e, and f. Each basic process can be carried out simultaneously without interferring with other basic processes. The decoded outputs of the decoder 6 are applied to the basic processors 8(8-1 through 8-n). Each of those basic processors perform only a single basic operation. For instance, the first basic processor 8-1 performs the change of the status, and other basic processors perform to set a timer for a time-out check, to transfer data to the host computer or a terminal, et al. It should be appreciated that the presence of a plurality of basic processors is the important feature of the present invention. The basic processors perform the basic processes a,b,c,d,e,f, etc. The outputs of the basic processors 8 are applied to the status memory 10 to change the status, to the host computer, and to terminals, etc.

Thus, according to the trigger code in the particular status, the plurality of basic processors 8 operate at the same time. It should be noted that a prior communication control unit operates the basic processes one after another in time sequence, but those basic processes are not carried out simultaneously.

TABLE 1

| Trigger | Status | | | | | | | | |
|---|---|---|---|---|---|---|---|---|---|
| | A | B | C | D | E | F | G | H | I |
| 1 | 01 | 20 | 20 | 20 | 20 | 20 | 20 | 20 | 20 |
| 2 | 10 | 02 | 01 | 06 | 0A | 06 | 20 | 20 | 10 |
| 3 | 10 | 03 | 20 | 07 | 07 | 20 | 20 | 20 | 10 |
| 4 | 10 | 04 | 20 | 08 | 08 | 20 | 20 | 20 | 10 |
| 5 | 10 | 05 | 20 | 09 | 0B | 20 | 20 | 20 | 10 |
| 6 | 10 | 20 | 20 | 20 | 20 | 20 | 0C | 20 | 10 |
| 7 | 10 | 10 | 10 | 10 | 10 | 10 | 10 | 0D | 10 |

TABLE 2

| Routine number | Combination of basic processes |
|---|---|
| 01 | d+e+f |
| 02 | b+d+e+f |
| 03 | a+d+e+f |
| 04 | a+b+e+f |
| 05 | a+b+e+f |
| 06 | d+e+f |
| 07 | a+c+d+e+f |
| 08 | a+b+d+e+f |
| 09 | a+e+f |
| 0A | b+d+e+f |
| 0B | a+b+e+f |
| 0C | a+d+e+f |
| 0D | a+f |

Now, the detailed explanation of the present communication control unit is presented in accordance with FIGS. 4 through 12.

Figure 4B:
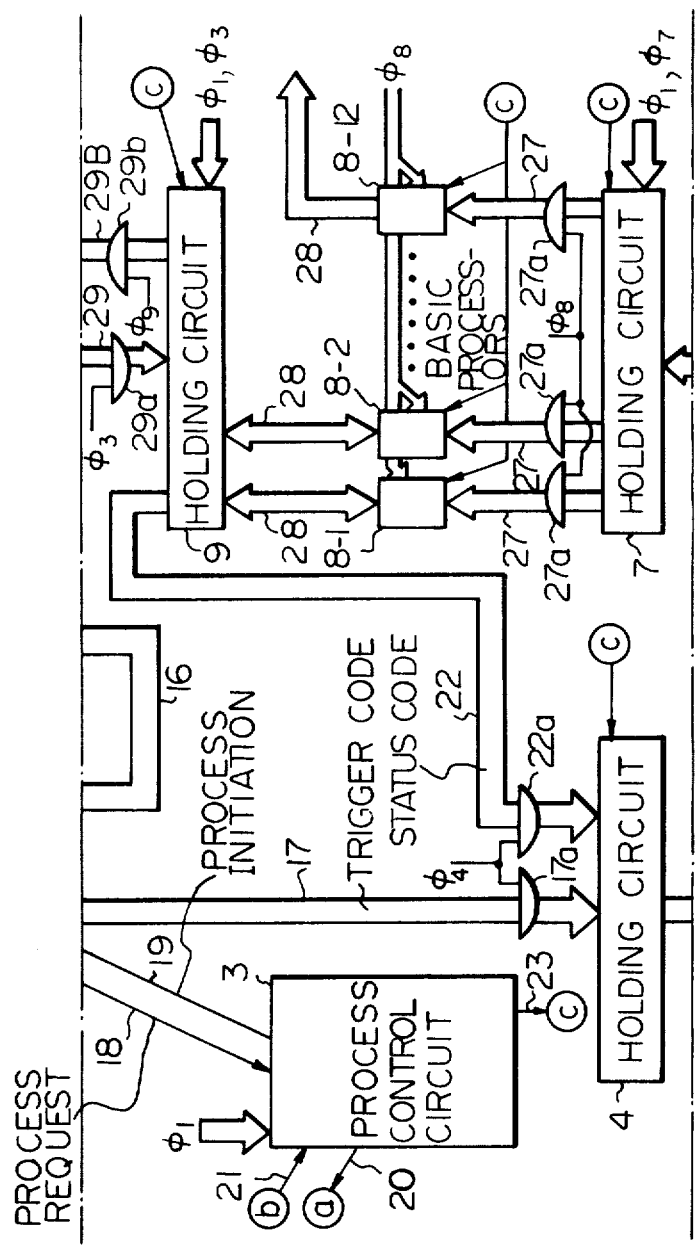
Figure 4C:
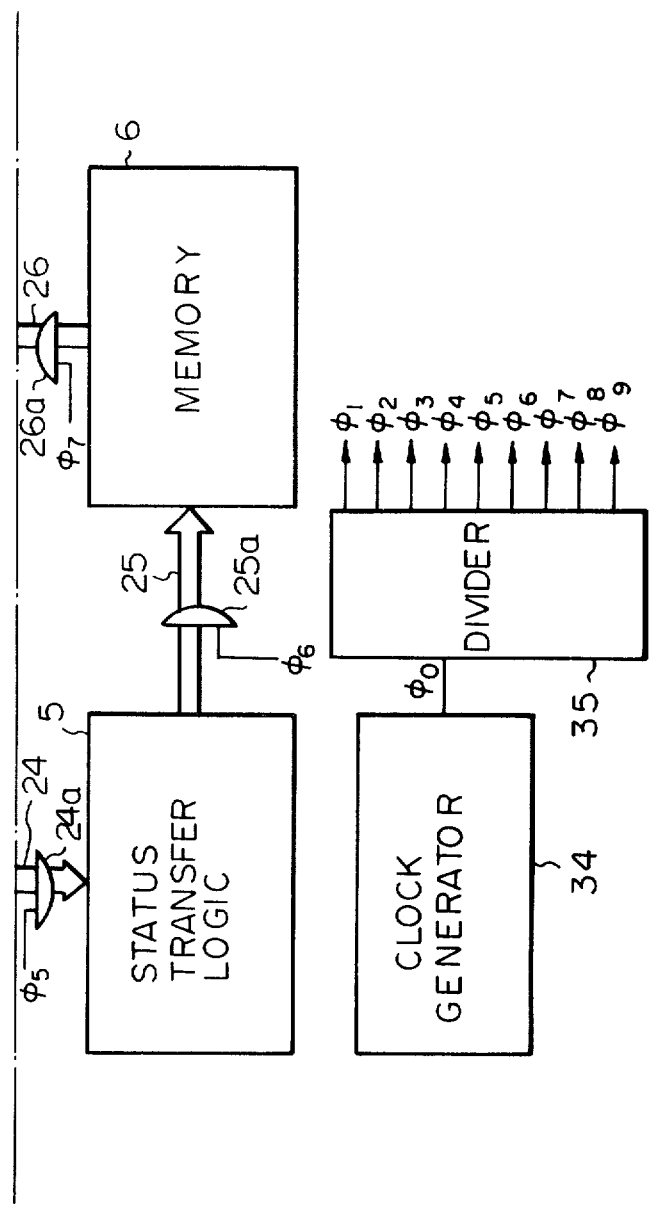

FIG. 4 is the detailed block diagram of the present communication control unit.

Figure 7D:
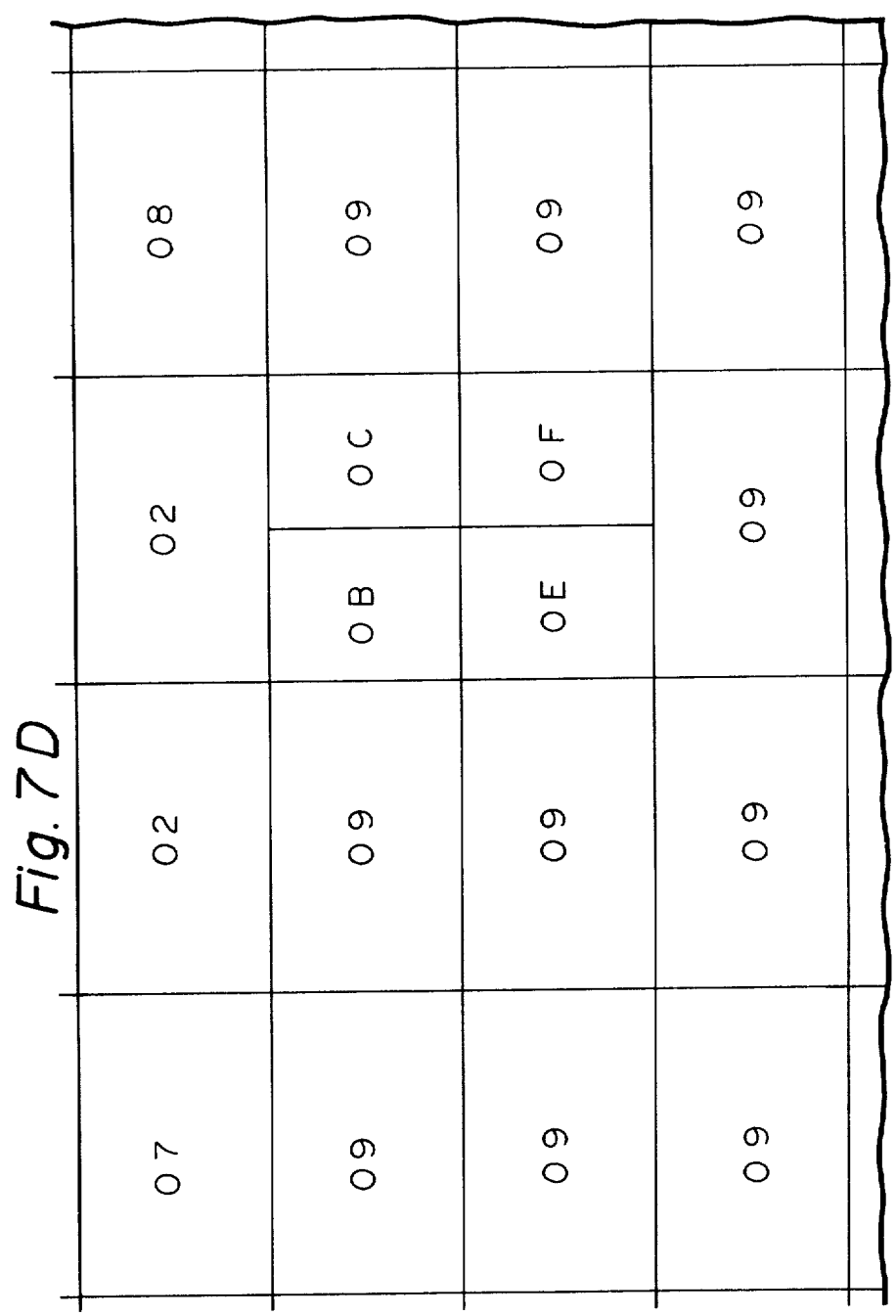

In FIG. 4, the reference numeral 1 is a trigger source, which is in actual terminals beyond communication lines and the host computer. The reference numeral 2 is a trigger data registration circuit, which is the same as that of FIG. 3, and is implemented by for instance a first-in-first-out(FIFO) memory storing a trigger data with the line number and a trigger code. The trigger data registration circuit 2 also receives input data(requests of triggers) from the timer circuit 11 of the present unit. The reference numeral 3 is a process control circuit which initiates the operation of the present communication control unit only when the timer circuit 11 is not active, the reference numeral 4 is a holding circuit(latch circuit) for holding a trigger code from the trigger data registration circuit 2 and a status code from another holding circuit 9. The reference numeral 5 is a status transfer logic, which is the same as 5 in FIG. 3, and is implemented by for instance a table memory, a combination of AND circuits, OR circuits and NOT circuits, or a programmable logic array(PLA). The status transfer logic 5 determines what operation the CCU should perform upon receipt of the trigger code in the particular status for the designated line. The content of the logic 5 is shown in FIG. 7, which is a part of the detailed and the actual logic of the CCU for a half duplex basic mode control procedure communication system, although the logic in the table 1 is simple just for the easy understanding. The reference numeral 6 is a decoder/table/memory which functions as the decoder 6 in FIG. 3. The content of the table memory 6 is shown in FIG. 8A and FIG. 8B which will be described later. The reference numeral 7 is a holding circuit for holding the output of the table memory 6. The reference numerals 8-1 through 8-12 are basic processors, which function the same as those of 8-1 through 8-n in FIG. 3. Each of those basic processors can operate at the same time, and will be described in more detail in accordance with FIG. 11. In the present embodiment, the process of the present CCU is composed of twelve basic processes, and so twelve basic processors are provided. The reference numeral 9 is a holding circuit for holding the output of the memory 10. The reference numeral 10 is a status memory, which is the same as that of 10 in FIG. 3, and that status memory 10 stores the instantaneous status code of each line as described in accordance with FIGS. 2A and 2B. The content of the memory 10 for each line is shown in FIG. 9. As apparent from FIG. 9, the memory 10 stores not only the status of each line, but also stores a plurality of timer pulse count data which are decremented by a timer circuit 11 et al. The reference numeral 11 is a timer circuit for decrementing the content of the timer pulse count data fields provided in the status memory 10 and registering a trigger data in the trigger data registration circuit 2 when the content of a timer pulse count data field reaches a predetermined value(for instance reaches zero).

Also, the reference numeral 12 is a signal line for connecting the output of the trigger source 1 to the input of the trigger data registration circuit 2, the reference numeral 13 is a signal line for connecting the trigger signal from the timer circuit 11 to the trigger data registration circuit 2, the reference numeral 14 is a data line for sending a data of line number and trigger code from the trigger source 1 to the trigger data registration circuit accompanied by said control signal on the signal line 12. The reference numeral 15 is a data line for sending a line number and a trigger code from the timer circuit 11 to the trigger data registration circuit 2 accompanied by said control signal on the signal line 13. The reference numeral 16 is a data line for sending a line number from the trigger data registration circuit to the status memory 10. Said line number is utilized as the address information for operating the memory 10. The reference numeral 17 is a data line for forwarding a trigger code from the trigger data registration circuit 2 to the holding circuit 4, and the reference numeral 18 is a signal line from the trigger data registration circuit 2 to the process control circuit 3. Said signal line 18 is energized when said trigger data registration circuit 2 receives at least one trigger code together with a line number. The reference numeral 19 is a signal line from the process control circuit 3 to the trigger code registration circuit 2. Said signal line 19 is energized when the process control circuit 3 allows the start of the process for the trigger data requested by the signal line 18. The reference numeral 20 is a signal line from the process control circuit to the timer circuit 11 for stopping the operation of the timer circuit 11 during the operation of the process of a trigger data, and the reference numeral 21 is a signal line from the timer circuit 11 to the process control circuit 3 for indicating that the timer circuit 11 is active. The signal lines 20 and 21 are provided so that the operation of the timer circuit 11 and a process according to a trigger code are not performed at the same time. The reference numeral 22 is a data line for sending a status code from the holding circuit 9 to the holding circuit 4. The reference numeral 23 is a signal line for allowing the operation for the process of a trigger data from the process control circuit 3 to the circuits 4,7,8,9 and 10. The reference numeral 24 is a data line from the holding circuit 4 to the status transfer logic 5 for transferring a trigger code and a status code. The reference numeral 25 is a data line from the status transfer logic 5 to the memory 6 for transferring the necessary operation which is indicated by the output of the memory 5 as shown in FIG. 7. The reference numeral 26 is a data line from the memory 6 to the holding circuit 7 for transferring the decoded outputs of the memory 6. The reference numeral 27 is a data line from the holding circuit 7 to the basic processors 8-1 through 8-12 and the reference numeral 28 is a data line (including a signal line) between the holding circuit 9 and the basic processors 8-1 through 8-12. The data lines 27 and 28 are shown in more detail in FIG. 10. The reference numeral 29 is a data line between the holding circuit 9 and the status memory 10, the reference numeral 30 is a data line between the timer circuit 11 and the status memory 10 for transferring the timer information. The reference numeral 31 is a signal line from the timer circuit 11 to the status memory 10 for the control of transferring the timer information on the data line 30. The reference numeral 32 is a data line from the timer circuit 11 to the status memory 10 for transferring the information for selection of one of the timer pulse count fields.

Further, the reference numeral 34 is a clock generator for generating a clock pulse $\phi_0$ for operating the present communication control unit. The frequency of that clock pulse is for instance 10 MHz. The reference numeral 35 is a divider for dividing the clock pulse $\phi_0$ to provide the timing pulses $\phi_1$ through $\phi_9$, which are applied to each of the members of FIG. 4.

Now, the operation of the unit of FIG. 4 is described. The operation is classified into a timer operation mode, and a trigger operation mode. In the timer operation mode, the timer circuit 11 updates the content of the timer pulse count fields in the status memory 10, and when the content of the timer pulse count field reaches zero, the trigger code with the line number showing the time-over condition is forwarded to the trigger data registration circuit 2 through the data line 15. In the trigger operation mode, the trigger data registered in the trigger data registration circuit 2 are processed.

Figure 5B:
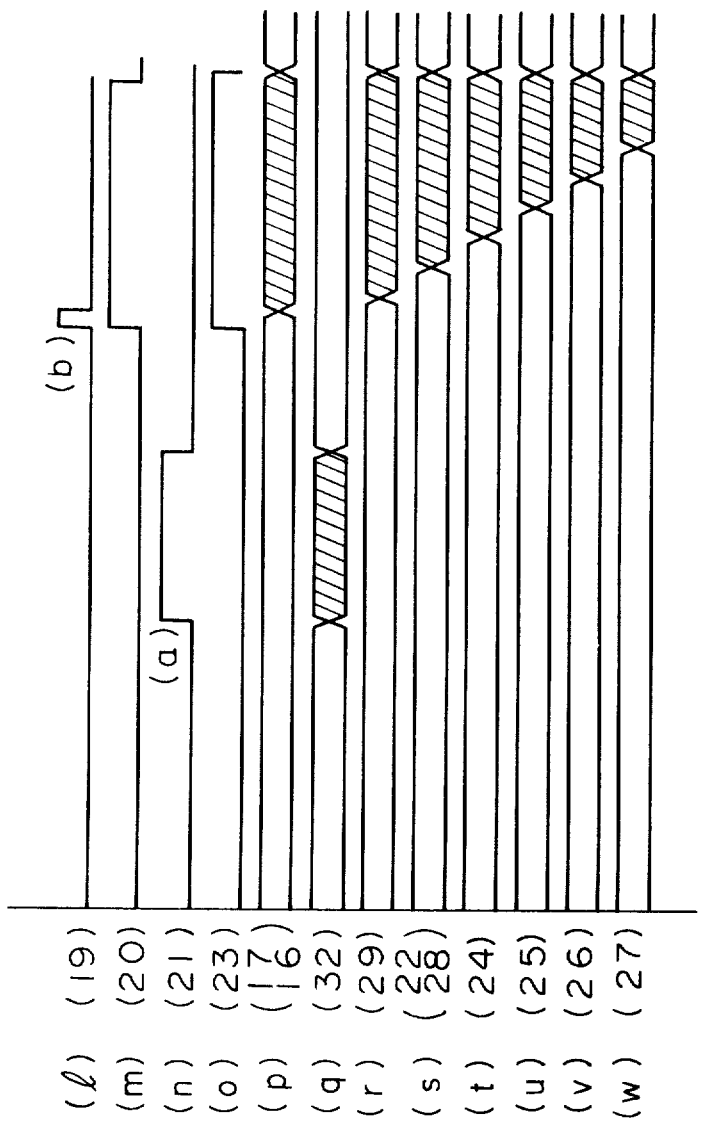

The timer operation mode is explained first in accordance with FIG. 5.

The timer circuit 11 has a counter(not shown) which counts the number of the clock pulses $\phi_0$ of the clock generator 34, and when that count reaches the predetermined value, for instance when the count shows that 100 millisecond of time has elapsed, the timer circuit 11 energizes the signal line 31 at the rising edge of the first timing pulse $\phi_1$ as shown by the symbol (a) of FIG. 5(n), on the condition that the signal line 20 is not in ON state. The ON state of the signal line 21(FIG. 5(n)) shows that the system is in the timer operation mode, and the ON state of the signal line 20(FIG. 5(m)) shows that the system is in the trigger operation mode. Therefore, both the signal lines 20 and 21 are not in ON state at the same time.

Then, the signal line 32 designates one of the timer pulse count fields(the field d of FIG. 9), of the particular line number, and the signal line 31 is energized. Then, the content of the timer pulse count field (field d) of the designated line is read out in the timer circuit 11. If the read out content of the timer pulse count field is not zero, the timer circuit 11 subtracts one from the read out content, and the result(difference) is stored again in status memory 10(the field d of FIG. 9). If the result of said subtraction is zero, the time over situation is recognized, and then, the signal line 13 is energized to transfer the trigger code with the line number to the trigger data registration circuit 2 through the data line 15.

The timer circuit 11 performs the above operation repetitively to all the lines registered in the status memory 10, and when the operation for all the lines is completed, the signal line 21 is de-energized to indicate the finish of the timer operation mode. In FIG. 5(n), the duration that the signal line 21 is in ON state is drawn to be short for the sake of the simplicity of the explanation, but that duration is longer than that shown in that drawing in an actual equipment.

Now, the trigger operation mode is explained. The operation of the trigger operation mode is performed according to the timing pulses $\phi_1$ through $\phi_9$ shown in FIG. 5(b through j), and each trigger operation is completed in the duration from $\phi_1$ to $\phi_9$.

When a trigger code with a line number is registered in the trigger data registration circuit 2, that circuit 2 makes the signal line 18 ON state to request the start of the trigger operation mode. The registration of trigger data in the trigger data registration circuit 2 is performed by the trigger source 1(line interface and the host computer), and the timer circuit 11. That registration of trigger data is not always synchronized with the timing pulses $\phi_1$ through $\phi_9$.

Upon receipt of that request from the trigger data registration circuit 2, the process control circuit 3 detects the presence of that request on the signal line 18(FIG. 5(k)) at the falling edge of the timing pulse $\phi_1$. Then, if the signal line 21 is in OFF state(which means that the timer operation mode is not running), the signal line 19 is energized (see the symbol(b) in FIG. 5(l)) to inform the circuit 2 that the request of the process is allowed. At the same time, the signal line 20 is changed to ON state to indicate the trigger operation mode(see FIG. 5(m)), and the signal line 23 is changed to ON state(see FIG. 5(o) to allow the operation of the members 4,7,8,9 and 10.

Figure 6:
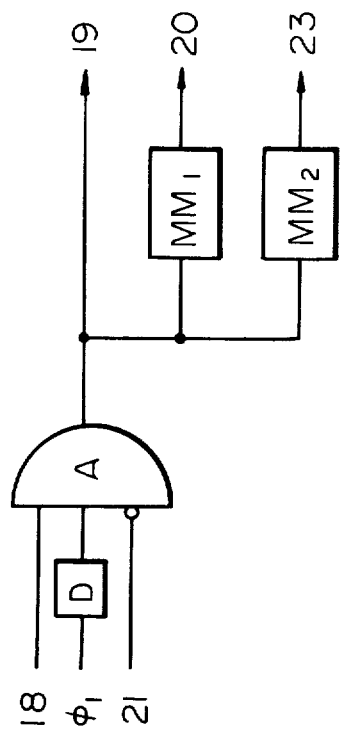
FIG. 6 is a block diagram of the process control circuit 3 in FIG. 4B.

From the above explanation, it should be appreciated that the structure of the process control circuit 3 is shown in FIG. 6, in which the symbol A is an AND circuit, D is a differentiation circuit for providing the output signal at the rear edge of an input pulse, and $MM_1$ and $MM_2$ are monostable multivibrators which provide the predetermined length of output pulse for each input trigger pulse respectively. The AND circuit A provides the output signal 19 at the rear edge of the timing pulse $\phi_1$ on the condition that the signal line 18 is in ON state and the signal line 21 is in OFF state. The monostable multivibrators $MM_1$ and $MM_2$ are triggered by the rising edge of the output pulse on the signal line 19 and provides the time duration as shown in FIG. 5(m) and FIG. 5(o) respectively. The time duration of $MM_1$ is determined so that the output of the $MM_1$ falls at the falling edge of the timing pulse $\phi_9$. The time duration of $MM_2$ is determined so that the output of the $MM_2$ falls at the rising edge of the timing pulse $\phi_1$.

Upon receipt of the signal on the signal line 19, the trigger data registration circuit 2 provides the trigger code to the holding circuit 4 through the data line 17, and also provides the address information(which is the same as the line number) to the status memory 10 through the data line 16. Of course, the oldest information registered in the circuit 2 is transferred to the holding circuit 4 and the status memory 10. After the transfer of the information to the holding circuit 4 and the status memory 10, if there is nothing left in the circuit 2, the circuit 2 changes the status of the signal line 18(FIG. 5(k)) to OFF state.

According to the operation allowed by the signal line 23, the status memory 10 provides the line status information at the timing $\phi_2$. The address of the status memory 10 is designated by the data line 16. The holding circuit 9 receives that information from the status memory 10 at the timing $\phi_3$ through the data line 29 and the AND circuit 29a. The format of the information read out from the status memory 10 is shown in FIG. 9 which is explained later. The holding circuit 9 provides, then, the status code(the field(O) of FIG. 9) and the sub-status code(the area P,Q,R,S,T in FIG. 9) to the holding circuit 4 through the data line 22.

From the above explanation, it should be appreciated that the information on the lines 16,17,32,29,22,28 are effective only in the shaded duration in FIG. 5(p,q,r,s).

Then, the holding circuit 4 receives the trigger code from the trigger data registration circuit 2 and the status code from the holding circuit 9 at the timing $\phi_4$ through the data line 17 and the AND circuit 17a, and the data line 22 and the AND circuit 22a, respectively. Then, the holding circuit 4 provides those codes on the data line 24, thus, the information on the data line 24 is effective only in the shaded duration in FIG. 5(t). Then, the status transfer logic 5 receives the information from the holding circuit 4 at the timing $\phi_5$ through the data line 24 and the AND circuit 24a. The logic operation in the status transfer logic 5 is shown in FIG. 7, which is described later. The status transfer logic 5 is implemented either by the combination of AND circuits, OR circuits, and NOT circuits. When the combination of AND circuits, OR circuits and NOT circuits is utilized, a PLA (programmable logic array) can be utilized. The output of the status transfer logic 5 is provided to the data line 25, which is effective in the shaded duration in FIG. 5(u).

The output of the status transfer logic 5 is applied to the memory 6 at the timing $\phi_6$ through the data line 25 and the AND circuit 25a. The structure and the operation of the memory 6 will be described in accordance with FIG. 8 later. The output of the memory 6 is provided on the data line 26, and the holding circuit 7 receives the information from the memory 6 at the timing $\phi_7$ through the data line 26 and the AND circuit 26a. Thus, the information on the data line 26 is effective only in the shaded duration in FIG. 5(v). The holding circuit 7 then provides the output signal to the output lines 27, which is effective in the shaded area in FIG. 5(w).

Each of the basic processors 8-1 through 8-12 receive the data at least until $\phi_8$ through the data lines 27, the AND circuits 27a, and the data lines 28, and operate simultaneously. The detailed explanation of the basic processors is described later. The outputs of the basic processors 8 are stored in the status memory 10 through the holding circuit 9 at the timing $\phi_9$, and also the outputs of the basic processors are applied to the host interface and/or the line interface (see FIGS. 1A and 1B).

Thus, the operation for processing a trigger data finished. Next, if another trigger data is stored in the trigger data registration circuit 2, that trigger data is accepted at falling edge of the timing pulse $\phi_1$ on the signal line 19(see FIG. 5(l)) on the condition that the signal line 21 is not in ON state, and the similar operation as mentioned above is repeated.

It should be appreciated that the holding circuit 4, the holding circuit 9, the holding circuit 7, and basic processors 8 and the status memory 10 operate on the condition that the signal line 23 is in ON state(see FIG. 5(o)).

FIG. 7 shows the example of the content of the status transfer logic 5, in which a part of the example for the half duplex basic mode control procedure communication system is shown. As described before, the status transfer logic 5 provides the operation to be performed according to the combination of the instantaneous status of the particular line and the trigger code to that line. In FIG. 7, the horizontal row shows the statuses, which have in actual situation the main status and the sub-status. The main status corresponds to the status (A through L) described in FIGS. 2A and 2B and is shown in the field O of FIG. 10. The sub-status is shown in the fields(P,Q,R,S,T) of FIG. 10 and is described in accordance with FIG. 10. The symbol(x) in a sub-status in FIG. 7 shows that the value(x) may be either 1or 0. The vertical column show the trigger codes. According to the combination of the status code and the trigger code, the operation to be performed is determined. For instance, when the status code is (01), and the trigger code is (05), then, the operation code(10) is provided by the status transfer logic 5. The technical meaning of each operation code in FIG. 7 is described later.

In FIG. 7, the status code(01) means the neutral status (which corresponds to the status A in FIG. 2A), the status code (02) means the status after reception of ENQ sequence(which corresponds to the status B in FIG. 2A), the status code(03) means the status that ACK response is being transmitted (which corresponds to the status C in FIG. 2A), the status code(04) means the status after transmitting ACK code responding to the received ENQ sequence(which corresponds to the status D in FIG. 2A), the status code(05) means the status after reception of data(which corresponds to the status E in FIG. 2A), and the status code(06) means the status that NAK code is being transmitted responding to the received data. NAK code in the communication control procedure means that there is something wrong in the data received, and perhaps, the data should be transmitted again.

In FIG. 7, the trigger code(00) means the reception of an ENQ sequence from a terminal(which corresponds to the trigger code A' in FIG. 2A), the trigger code (01) means the reception of data from a terminal(which corresponds to the trigger code D' in FIG. 2A), the trigger code (02) means the end code from a line interface(which corresponds to the trigger code I' in FIG. 2A), the trigger code(03) means the instruction from the host computer to send ACK code(which corresponds to the trigger code E' in FIG. 2A), the trigger code (04) means the instruction from the host computer to send NAK code, the trigger code(05) means the instruction from the host computer to establish a downward data link from the host computer to the terminal.

It should be appreciated of course that the actual content (the content of FIG. 7) should be defined according to the communication control procedure applied to an actual communication control unit.

Also, it should be noted that FIG. 7 is indicated in the hexadecimal system having 16 numerical figures(0,1,2,3, 4,5,6,7,8, 9,A,B,C,D,E,F). Therefore, the symbol (0A) in FIG. 7 is the same as (10) in the decimal system, and the symbol (0D) in FIG. 7 is the same as(13) in the decimal system.

The status transfer logic 5 for providing the outputs of FIG. 7 is implemented either by a combination of AND circuits, OR circuits and NOT circuits(or a programmable logic array (PLA)), or by a table memory.

The output of the status transfer logic 5 as shown in FIG. 7 is applied to the memory 6, which is a random-access memory or a read-only-memory, as an address information for that memory, and the memory 6 decodes the operation code from the status transfer logic 5.

FIG. 8 shows the example of the content of the memory 6. In FIG. 8, the vertical column(00,01,02,,,,OF,10) indicates the address of the memory 6, and said address information is provided by the output of the status transfer logic 5. The memory 6 provides the decoded output to the fields A through N. The meaning of each field(A-N) is described later. The indication in FIG. 8 is the hexadecimal system as is the case of FIG. 7. For instance, at the address (07) of the memory 6, the contents 04 for A field, 0 for B field, 0 for C field, 1 for D field, 0 for E field, 1 for F field, 0 for G field, 0 for H field, 1 for I field, 5 for J field, 00 for K field, 02 for L field, 00 for M field, and 000000 for N field are stored. Accordingly, when the particular address of the memory 6 is designated, the decoded outputs for each fields are provided at the output of the memory 6, and that output is applied to the basic processors 8-1 through 8-12, through the holding circuit 7.

Now, the meaning of the fields A through N as shown in FIG. 8 will be described.

The field A which has 8 bits of output is called "a status transfer field", and when the content of that field is (00) in hexadecimal expression, no transfer of the status is performed. On the other hand, when the content of the field A is not (00), that field A shows the new status to be transferred. For instance, at the address (07) in FIG. 8, the content of the field A is (04), and so the new status is transferred to the status code (04).

The field B having 2 bits functions to change the flag of the field P in the status memory 10. The field P in the status memory 10 is a flag bit indicating the notice that the predetermined repetition times of transmissions or receptions are performed. In the field B, when the content is 0 or 3, the flag in the field P in FIG. 9 is not changed, when the content is 1, the flag P in FIG. 9 is set to "1", and when the content of the field B is 2, the flag P is set to zero.

The fields C and D each having 2 bits function to change the flags in the fields Q and R(see FIG. 9), respectively, in the status memory 10. The field Q in the status memory 10 is the flag to discriminate characters for the ACK code and the NAK code in the transmission side, and the field R in the status memory 10 is the flag to discriminate characters for the ACK code and the NAK code in the reception side. That discrimination is provided according to the communication control procedure, in which characters for the ACK code and characters for the NAK code are utilized alternately for the response for the correct transmission and the wrong transmission. For example, when DLE;ACK characters indicates the correct transmission(the ACK code) and DLE;NAK characters indicates the wrong transmission(the NAK code) in the first transmission, the operation of those characters changes in the second transmission, and DLE;ACK characters indicates the wrong transmission and DLE;NAK characters code indicates the correct transmission in the second transmission. The fields C operates when the present CCU is in the transmission side, and the field D operates when the present CCU operates in the reception side.

In the fields C and D, when the content is 0 or 3, the flags(Q,R) are not changed, when the content is 1, the flags in the fields Q and R are set to '1', respectively, and when the content of the field C and D is 2, the flags in the field Q and R are set to zero, respectively.

The field E having 2 bits functions to change the flag in the field S of the status memory 10(see FIG. 9), and the field F having 2 bits functions to change the flag in the field T in the status memory 10. The flag in the field S in the status memory 10 shows that the transmission data link has been established, and the flag in the field T in the status memory 10 shows that the reception data link has been established. When the contents of the fields E and F are 0 or 3, respectively, the flags in the fields S and T are not changed, when those contents of the fields E and F are 1, respectively, the flags in the fields S and T are set to '1', respectively, and when the contents of the fields E and F are 2, respectively, the flags in the fields S and T are set to zero, respectively.

The field G having 2 bits controls the content of the field V in the status memory 10 in FIG. 9. When the content of the field G is 0 or 3, the content of the field V is not changed, when the content of the field G is 1, the content of the field V is incremented by one, and when the content of the field G is 2, the content of the field V is set to zero.

The field H having 2 bits functions similar to the field G, for controlling the content of the field X in the status memory 10.

The fields I and J control the contents of the fields (Y,Z,a,b,c,d) in the status memory 10 in FIG. 9. In FIG. 9, the fields(Y through c) store the predetermined fixed values for the purpose of the time-over check, and the content of the field d is variable. The field J having 3 bits designates one of the predetermined values in those fields(Y through c) for the desired upper limit of the time check. When the content of the field I is 0 or 3, the content of the timer field d is not changed, when the content of the field I is 1, the content of the field designated by the field J is set in the field d of FIG. 9, and when the content of the field I is 2, the content of the field d is set to zero. As described before, the content of the field d is decremented by the timer circuit 11 for the time-over check purpose.

The fields K,L,M and N concern the communication between the host computer and the terminal.

The field K with 8 bits has a code to be reported to the host computer. When the content of the field K is 00, no report is carried to the host computer. When the content of the field K is not 00, the code in the field K is reported to the host computer. The code to be reported to the host computer is for instance the report of the data reception, the report of the reception of the end code et al.

The field L with 8 bits has a code to be reported to a line interface. When the content of the field L is 00, no report is forwarded to the line interface, and when the content of the field L is not 00, the code designated by the field L is forwarded to the line interface. The code to be sent to the line interface is for instance the instruction of the transmission of the data, the instruction to relinquish the line, the instruction to stop the operation et al. When the code in the field L designates the transmission of data in the working memory(see FIG. 1A), the length and the start address of the data are designated by the fields M and N, respectively.

The field M having 8 bits designates the length of the data to be transmitted or received when the data transmission is instructed by the field L.

The field N having 24 bits shows the start address in the working memory for the data to be transmitted, when the field L instructs the transfer of the data between the host computer and the terminal.

FIG. 9 shows the content of the status memory 10 for each line.

In FIG. 9 the field O having 8 bits stores the instantaneous status code.

The field P having 1 bit is a flag for the notice of the repetition times, which are stored in the fields V and X. That is to say, when the number of the repetition times reaches the predetermined number, the flag P is turned ON to indicate said situation of having repeated the predetermined number. When the flag P is 0, it means that none of the fields V and X reach the predetermined value(fields U and W respectively), and when the flag P is 1, it means that at least one of the content of the field V or X reaches the predetermined value(U or W).

The field Q having 1 bit is a flag for discriminating the characters for the ACK code and the NAK code when the system is a transmitter. According to the flag Q, the characters of the ACK code and the NAK code are reversed. When the flag Q are 0, the DLE;ACK characters are interpreted as the ACK code, and the DLE;NAK characters are interpreted as the NAK code. On the other hand, when the flag Q is 1, the DLE;NAK characters are interpreted as the ACK code, and the DLE;ACK characters are interpreted as the NAK code.

The field R having 1 bit functions the same as that of the field Q, when the present system is a receiver.

The field S having 1 bit shows whether a transmission data link has been established or not. When the flag S is 0, the transmission data link has not been established, and when the flag S is 1, the transmission data link has been established.

The field T having 1 bit shows whether a reception data link has been established or not. When the flag T is 0, the reception data link has not been established, and when the flag T is 1, the reception data link has been established.

The fields P,Q,R,S and T in FIG. 9 are called a sub-status, which has been mentioned in accordance with FIG. 7. Therefore, the content of the sub-status in the fields P,Q,R,S,T affects the operation of the status transfer logic 5 as shown in FIG. 7.

The fields U,V,W,X each having 8 bits concern a count field for counting the repetition times(like the repetition times of the transmission/reception of data, et al). The fields U and V compose the first count system, and the field U having 8 bits stores the predetermined fixed value, and the field V is a variable count field to be incremented for each trial until the content of the count field V reaches the predetermined value in the field U. The situation that the counted value in the field V reaches the value of the field U, is the alarm situation, and the P field bit is turned ON.

The fields W and X each having 8 bits compose the second count system, which operates in the same manner as the first one(U,V), and the field W has the predetermined fixed value, and the field X is a variable count field to be incremented.

The fields Y,Z,a,b,c,d each having 8 bits concern timers. The first 5 fields Y,Z,a,b and c store the predetermined fixed values for the upper limits of the time-check, and the field d is the variable counting field to be decremented in every predetermined period(for instance 100 MSec). The field d is decremented by the timer circuit 11 as described before.

Figure 10:
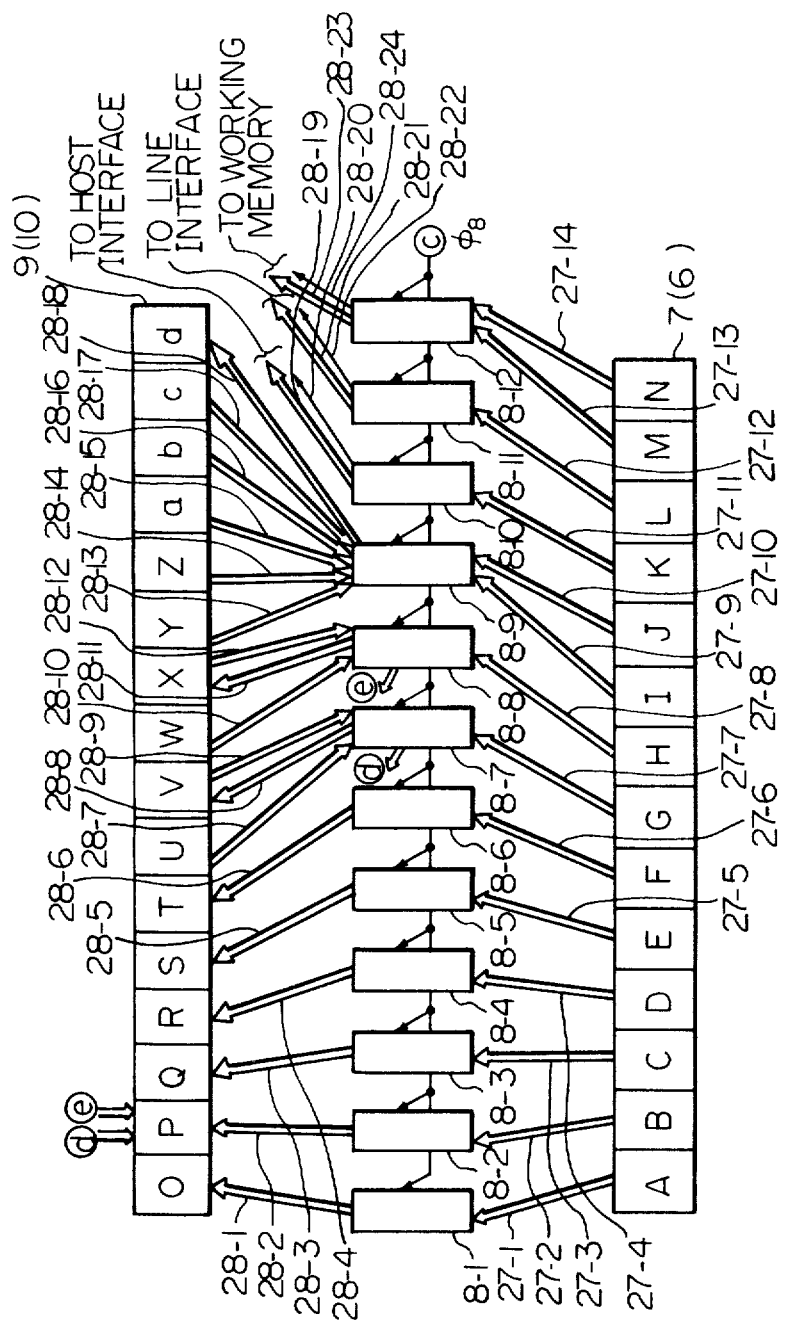
FIG. 10 shows the configuration of the basic processors 8-1 through 8-12 in FIGS. 4-4C.

FIG. 10 shows the basic processors 8-1 through 8-12 in more detail. The basic processors 8-1 through 8-12 receive the decoded instructions from the memory 6 through the holding circuit 7 and the data lines 27-1 through 27-14 as shown in FIG. 10. Those instructions have the fields A through N as shown in FIG. 10 and are described in accordance with FIG. 8. The basic processors(8-7,8-8,8-9) receive also the data from the status memory 10 through the holding circuit 9 and the data lines(28-7,28-9,28-10, 28-12, 28-13, 28-14, 28-15, 28-16, and 28-17). The information of the status memory 10 has the fields O through d as mentioned before. The basic processors process those instructions and the data, and the outputs of the basic processors are forwarded to the status memory 10(fields O,P,Q,R,S,T,V,X,d), the host computer, and/or the line interface through the data lines and signal lines 28-1 through 28-24. The lines 28-19 and 28-20 go to the host interface, the lines 28-21 and 28-22 go to the line interface, and the lines 28-23 and 28-24 go to line interface. Those basic processors 8-1 through 8-12 operate simultaneously, and that simultaneous operation of the basic processors is the important feature of the present invention. The symbol Ⓒ in FIG. 10 shows the signal of the signal line 23(see FIG. 4), and the basic processors operate only when that signal line 23 is ON.

Now, each of the basic processors 8-1 through 8-12 is described.

The first basic processor 8-1 receives the data in the field A which is provided by the memory 6 through the line 27-1. When the field A is zero(00), the basic processor 8-1 does not operate, and when the field A is not zero, the basic processor 8-1 transfers directly the content of the field A to the field O of the status memory 10 through the line 28-1 and the holding circuit 9.

The basic processors 8-2 through 8-6 operate according to the contents of the fields B through F, respectively. When the content of the related field is 0 or 3, the related basic processor does not operate, when the content of the field is 1, the basic processor writes the data '1' in one of the fields P through T in the status memory 10, and when the content of the field is 2, the basic processor writes 0 in one of the fields P through T. Of course the fields B,C,D,E,F correspond to the fields P,Q,R,S,T, respectively. To write 0 means to reset a flag, and to write 1 means to set a flag.

The basic processor 8-7 controls the repetition count data in the fields U and V according to the instruction bit in the field G. The field U stores the upper limit of the repetition times, and the field V operates as a count field which is incremented in each trial. When the content of the field G is 0 or 3, the basic processor 8-7 does not operate. When the content of the field G is 1, the basic processor 8-7 adds one to the content of the field V, and the sum is stored again in the field V. Further, if the sum reaches equal to the value of the field U, the basic processor 8-7 turns the flag ON in the field P. The flag in the field P is the notice that the repetition times reaches the predetermined values. When the field G is 2, the basic processor 8-7 resets the content of the field V to zero.

The basic processor 8-8 operates in the same manner as that of the basic processor 8-7, and said basic processor 8-8 handles the fields X,W and P, according to the content of the field H, where the field W stores the predetermined upper limit of the repetition times, and the field X operates as a counter which is incremented in each trial. When the content of the field H is 0 or 3, the basic processor 8-8 does not operate. When the content of the field H is 1, the basic processor 8-8 adds one to the content of the field X, and the sum is stored again in the field X. If the sum reaches equal to the value of the field W, the basic processor 8-8 turns the flag ON in the field P. When the content of the field H is 2, the basic processor 8-8 resets the content of the field X to zero.

The basic processor 8-9 controls the timer pulse count data in the field d according to the contents of the fields I and J. The fields Y,Z,a,b and c, each having 8 bits, store the predetermined upper limits of the time, and one of the fields Y,Z,a,b and c is selected according to the desired upper limit of the waiting time. The basic processor 8-9 selects one of said fields(Y,Z,a,b,c) according to the contents of the field J. When the content of the field I is 0 or 3, the basic processor 8-9 does not transfer one of the contents (Y,Z,a,b,c) to the field d. When the content of the field I is 1, the basic processor 8-9 transfers the content of the selected field(Y,Z,a,b or c) to the field d, and when the content of the field I is 2, the basic processor 8-9 resets the field d to '00'. The content of the field(d) is decremented by the timer circuit 11 for the time-over check as mentioned before.

The basic processor 8-10 operates according to the content of the field K. When the content of the field K is '00', the basic processor 8-10 does not operate. When the content of the field K is not '00', the content of the field K is reported to the host computer together with the line number of the terminal.

The basic processor 8-11 operates according to the content of the field L. When the content of the field L is '00', the basic processor 8-11 does not operate. When the content of the field L is not '00', the basic processor 8-11 transfers the content of the field L to the line interface. When the content of the field L designates the transfer of the data stored in the working memory, the length of the data and the start address of the data in that memory are defined by the fields M and N which are handled by the basic processor 8-12.

The basic processor 8-12 operates according to the contents of the fields M and N. When the content of the field M is '00', or the content of the field N is '000000', the basic processor 8-12 does not operate. Otherwise, the basic processor 8-12 transfers those contents of the fields M and N to the line interface, as the data length and the start address of the working memory.

Figure 11A:
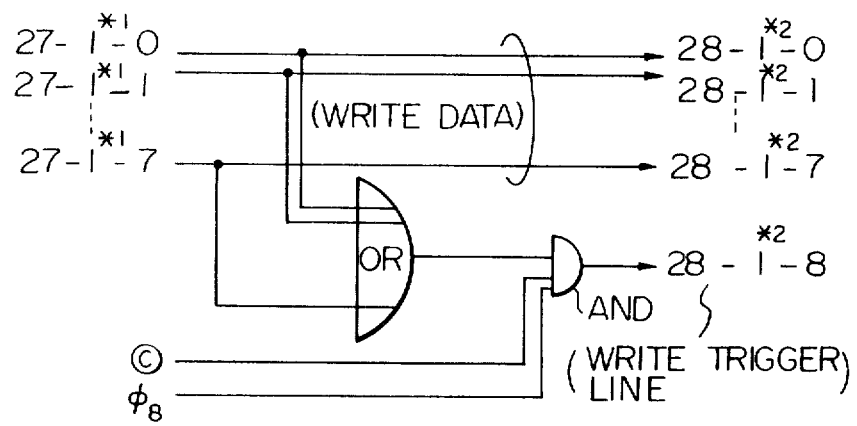
FIG. 11(A) through FIG. 11(E) show the block diagrams of the basic processors 8-1 through 8-12.

FIGS. 11A through 11E show the structure of the basic processors 8-1 through 8-12 in detail. FIG. 11A shows the structure of the basic processor 8-1. The basic processor 8-1 receives the contents of the field A through the data lines 27-1-0 through 27-1-7, and provides the write data to the field O through the data lines 28-1-0 through 28-1-7. The write trigger for the field O is provided by the signal line 28-1-8 at the timing of $\phi_8$ on the condition that the contents of the field A is not zero and the signal line 23 is in ON state. The structure of the basic processors 8-10 and 8-11 are the same as FIG. 11A. In case of the basic processor 8-10, the numerals with the asterisk numeral *1 are replaced by 11(for instance, 27-1-0 is replaced by 27-11-0, and 27-1-1 is replaced by 27-11-1 et al), and the numerals with the asterisk numeral *2 are replaced by 20(for instance, 28-1-0 is replaced by 28-20-0, and 28-1-1 is replaced by 28-20-1 et al). Similarly, in the case of the basic processor 8-11, the numerals with the asterisk numeral *1 are replaced by 12(for instance, 27-1-0 is replaced by 27-12-0, and 27-1-1 is replaced by 27-12-1, et al), and the numerals with the asterisk numeral *2 are replaced by 22(for instance, 28-1-0 is replaced by 28-22-0, and 28-1-1 is replaced by 28-22-1, et al).

Figure 11B:
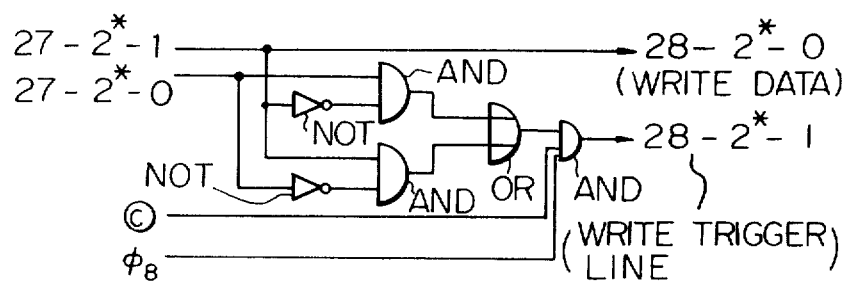

FIG. 11B shows the structure of the basic processor 8-2. The basic processor 8-2 receives the less significant bit in the field B through the data line 27-2-1, and provides said data to the field P through the data line 28-2-0. The write operation in the field P is performed at the timing pulse $\phi_8$ on the condition that the value of the field B obtained through the data lines 27-2-0 and 27-2-1 is not "0" nor "3", and the signal line 23 is in ON state. The structure of the basic processors 8-3, 8-4, 8-5 and 8-6 are the same as FIG. 11B. In case of the basic processor 8-3, the numerals with the asterisk * are replaced by 3, in case of the basic processor 8-4, the numerals with the asterisk * are replaced by 4, in case of the basic processor 8-5, the numerals with the asterisk * are replaced by 5, and in case of the basic processor 8-6, the numerals with the asterisk * are replaced by 6.

Figure 11C:
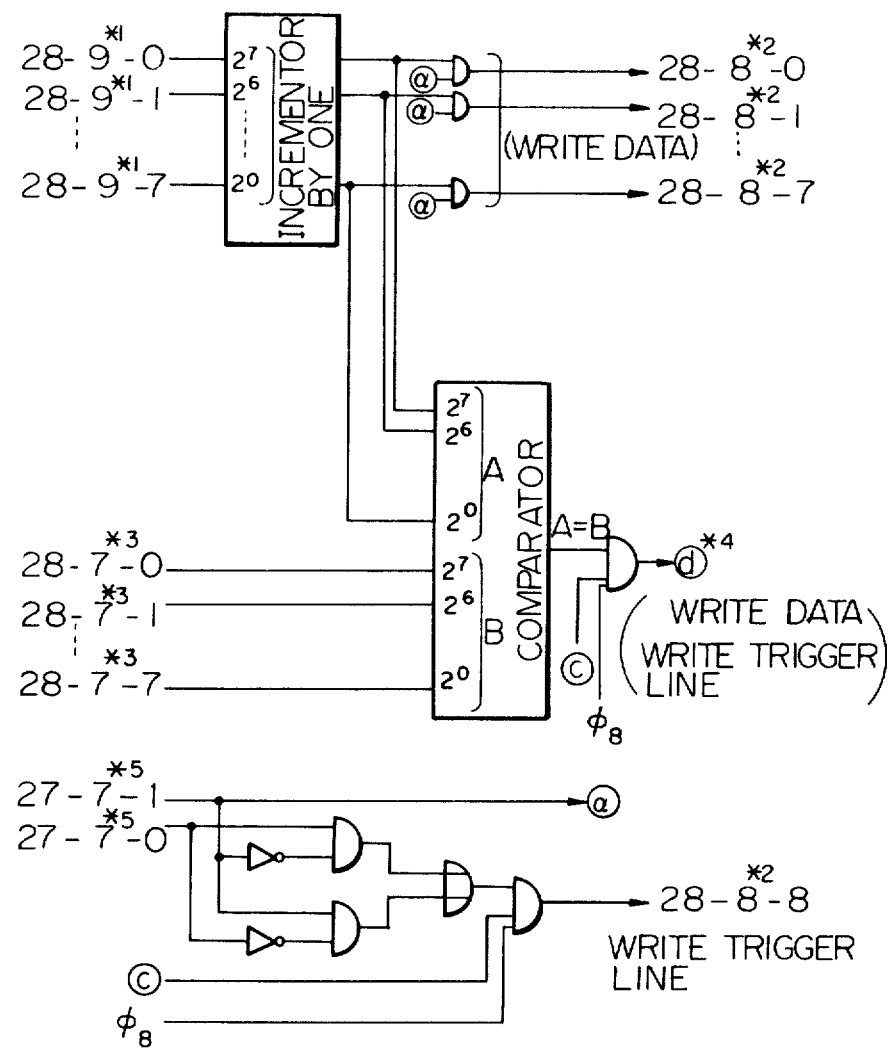

FIG. 11C shows the structure of the basic processor 8-7, which receives the contents of the field V through the data lines 28-9-0 through 28-9-7, and adds one to said contents. The result of the addition is written in the field V. The write operation is performed at the timing pulse $\phi_8$ on the condition that the value of the field G obtained through the data lines 27-7-0 and 27-7-1 is not "0" nor "3", and the signal line 23 is in ON state. Further, when the write data for the field V is the same as the value of the field U obtained through the data lines 28-7-0 through 28-7-7, the value "1" is written in the field P at the timing pulse $\phi_8$ on the condition that the signal line 23 is in ON state. The structure of the basic processor 8-8 is the same as FIG. 11C. In case of the basic processor 8-8, the numerals with the asterisk numeral *1 are changed to 12, the numerals with the asterisk numeral *2 are changed to 11, the numerals with the asterisk numeral *3 are changed to 10, the symbol with the asterisk numeral *4 is changed to ⓒ, and the numerals with the asterisk numeral *5 are changed to 8.

Figure 11D:
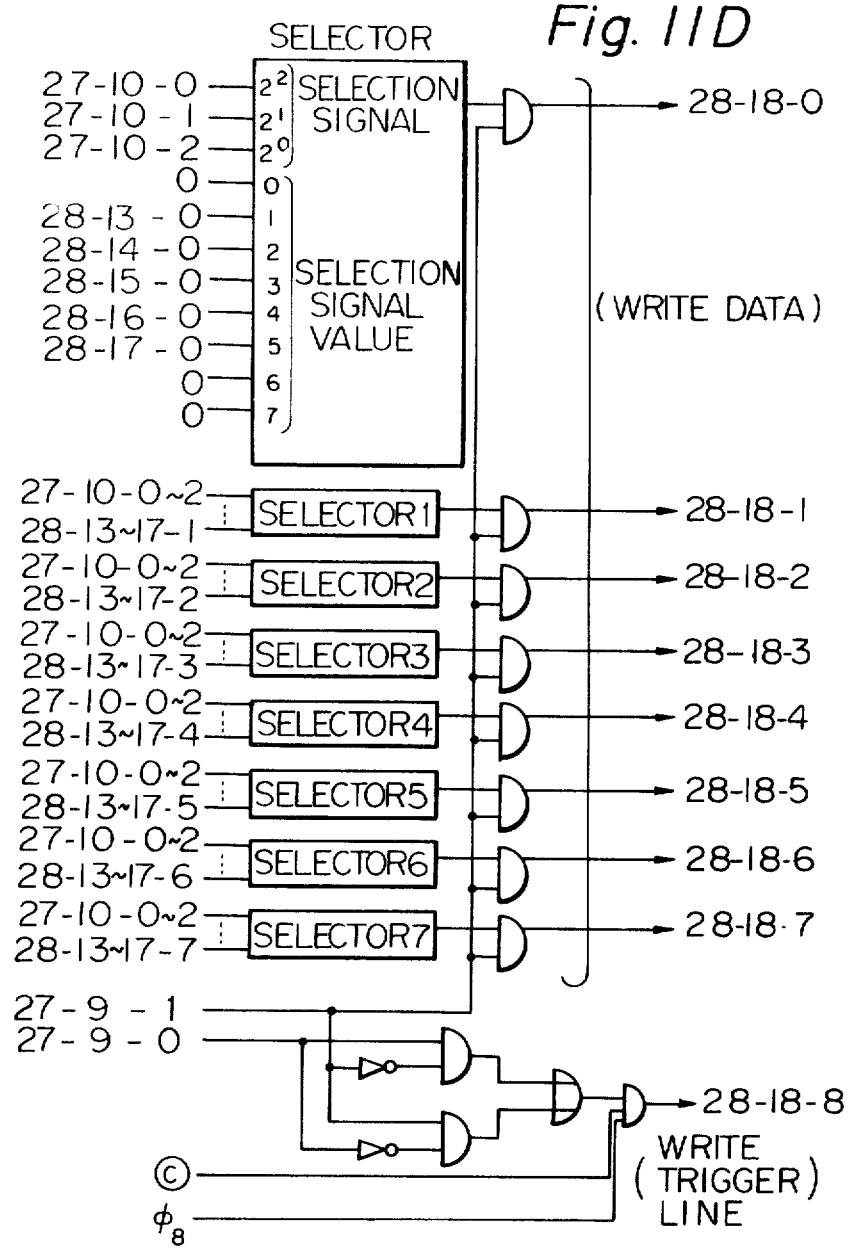

FIG. 11D shows the structure of the basic processor 8-9, which receives the contents of the field J through the data lines 27-10-0 through 27-10-2 as selection data, and according to said selection data, the basic processor 8-9 selects one of the data in the fields Y through c obtained through the data lines 28-13~17-0 through 28-13~17-7. The selected data is written into the field d through the data lines 28-18-0 through 28-18-7. The write operation is performed at the timing pulse $\phi_8$ on the condition that the value of the field I obtained through the data lines 27-9-0 and 27-9-1 is "1" and the signal line 23 is in ON state. On the other hand, when the value of the field I is "2", the data "00" is written in the field d.

Figure 11E:
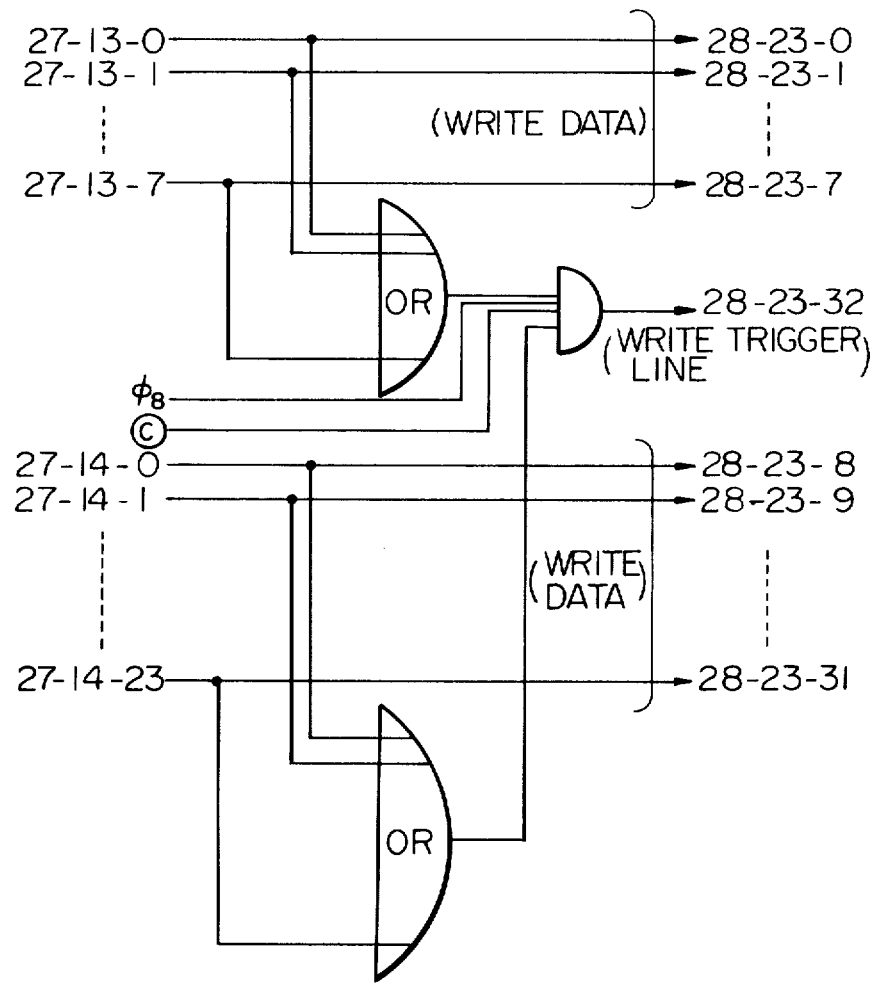

FIG. 11E shows the structure of the basic processor 8-12, which transfers the data of the field M obtained through the data lines 27-13-0 through 27-13-7 to the line interface through the data lines 28-23-0 through 28-23-7, and also transfers the data of the field N obtained through the data lines 27-14-0 through 27-14-23 to the line interface through the data lines 28-23-8 through 28-23-31. The signal line 28-23-32 informs the line interface that said information to the line interface is available on the condition that none of the information pertaining to the fields M and N is "00" nor "000000", and the signal line 23 is in ON state at the timing pulse $\phi_8$.

Figure 12B:
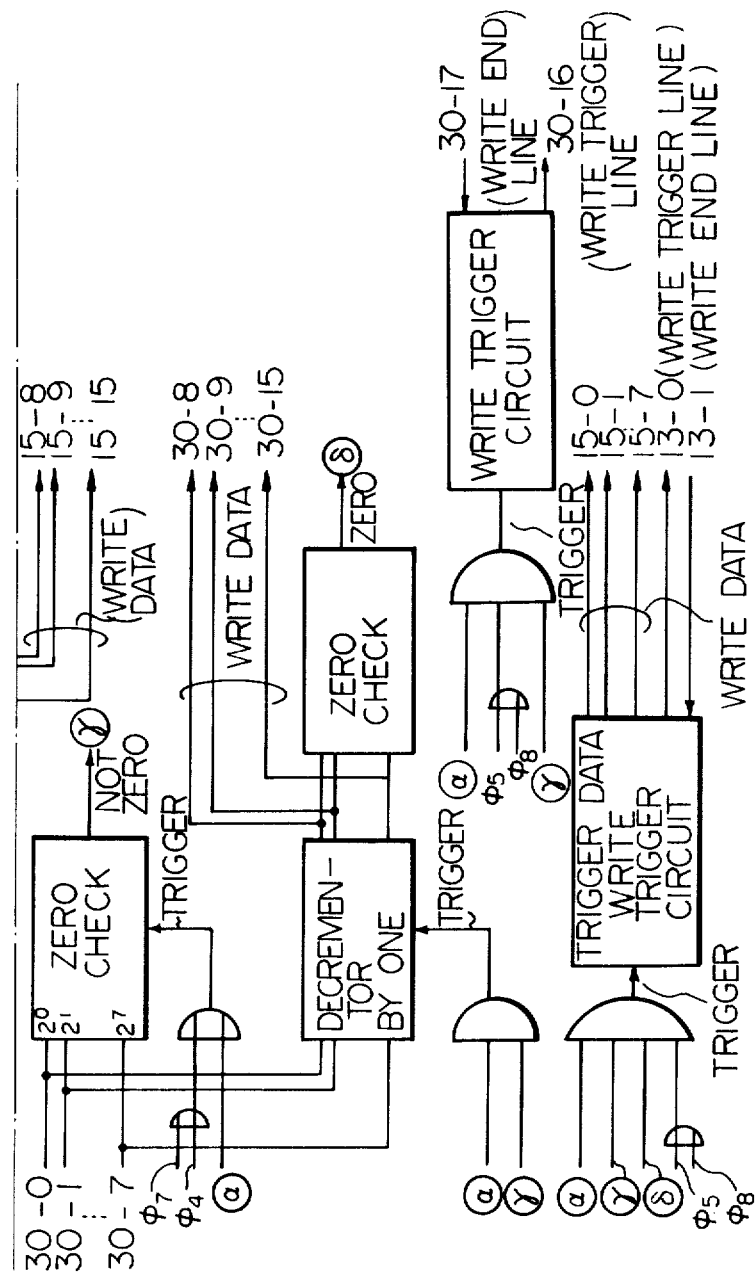
FIG. 12 is a block diagram of the timer circuit.

FIG. 12 shows the structure of the timer circuit 11, which is triggered in every predetermined period(for instance in every 100 mili-second) by the DIVIDER which divides the timing pulse $\phi_0$. The symbol A in FIG. 12 is a flip-flop for holding the trigger signal until the trigger operation is completed. The trigger signal is accepted at the rising point of the timing pulse $\phi_1$ on the condition that the signal line 20 is in OFF state(which is not in the trigger operation mode), and at the same time as the trigger signal is accepted the signal line 21 is turned to ON state indicating the timer operation mode. The symbol B in FIG. 12 is a flip-flop for indicating the timer operation mode.

The timer circuit thus triggered, triggers the SCANNER, which outputs the read information for reading the timer information for each line through the data lines 32-0 through 32-7. In the timer operation mode, the SCANNER is triggered at the timing pulse $\phi_2$ or $\phi_3$ on the condition that the timer control of the preceding timer is finished(in that condition, the flip-flops C and D are in ON state). The SCANNER outputs the read information for reading the timer information in the status memory 10 through the data lines 32-0 through 32-7, and makes the read trigger line effective. The read trigger of the timer information is carried out through the signal line 31 on the condition that said signal line is in ON state at the timing pulse $\phi_3$ or $\phi_6$. The timer information obtained through the data lines 30-0 through 30-7 is applied to the ZERO CHECK circuit which checks whether or not the input data is zero at the timing pulse $\phi_4$ or $\phi_7$. If the result is zero, the process relating to the present timer information is completed. If the result is not zero, the timer information is decremented by one, and the difference becomes the write information to the status memory 10 through the data lines 30-8 through 30-15. The result of said decrementation by one is checked once again to determine whether the result is zero or not, and if the result is zero, the trigger data is prepared at the timing pulse $\phi_5$ or $\phi_8$, and said trigger data becomes the input information for the trigger data registration circuit 2 through the data lines 15-0 through 15-15. In that case, at the same timing, the instruction for writing the timer information and writing the trigger data is related to the status memory 10 and the trigger data registration circuit 2 through the signal line 30-17 and the signal line 13-0.

Now, some operational examples are explained below.

Operational Example (1)

It is assumed that the status of the particular terminal is the status that the ACK code has been transmitted to the terminal as the response to the ENQ sequence from the terminal, and the trigger code meaning that a data block has been received, is generated in the line interface. In this situation, the status code is (04) and the substatus code is (01011) in FIG. 7, and the trigger code is (01) in FIG. 7. In this situation, the present CCU must operate (1) to change the status, (2) to report the reception of a data block to the host computer, (3) to reset the timer, (4) to reset the repetition times count field, and (5) to reset the flag in the field P since a correct data was received within the predetermined repetition trial.

In this situation, the status transfer logic 5 receives the status code(04) and the sub-status code(01011), and the trigger code(01) through the data line 24, and said status transfer logic 5 provides the operation (06) according to FIG. 7 (see that operation code is (06) for the status code(04), the sub-status code(01011) and the trigger code(01) in FIG. 7). That code (06) is transferred to the memory 6, which outputs the content of the address(06). As shown in FIG. 8, the output of the memory 6 at the address(06) is;

| A | B | C | D | E | F | G | H | I | J | K | L | M | N |
|---|---|---|---|---|---|---|---|---|---|---|---|---|---|
| 05 | 2 | 0 | 0 | 0 | 0 | 2 | 0 | 2 | 5 | 05 | 00 | 00 | 000000 |

Since the content of the field A is (05), the basic processor transfers that content to the field O in the status memory 10 through the holding circuit 9, then, the new status of this circuit is (05) which means the status after reception of data.

According to the content(2) of the field B, the basic processor 8-2 resets the flag P in the status memory 10 through the holding circuit 9.

The basic processors 8-3 through 8-6 do not operate, since the contents of the fields C,D,E,F are 0.

The basic processor 8-7 resets the content of the field V which counts the repetition times of the data transmission since the correct data is received, according to the content(2) of the field G.

The basic processor 8-8 does not operate, since the content of the field H is 0.

The basic processor 8-9 resets the content of the field d since the content of the field I is 2.

The basic processor 8-10 transfers the content of the field K to the host computer, since the content of the field K is not zero.

The basic processor 8-11 does not operate, since the content of the field L is 00.

The basic processor 8-12 does not operate, since the contents of both the fields M and N are zero.

Operational Example (2)

It is assumed that the status code is (03) which is the status that the ACK code is being sent to the terminal as the response to the ENQ sequence, and the sub-status is (00000).

And it is assumed that the trigger code is (02) which means that the end code from the line interface was received.

In this situation, the present CCU must operate (1) to change the status, (2) to set the flag ON indicating that the reception data link has been established, (3) to determine the characters for the ACK code and the NAK code of the reception data link, (4) to set a timer, and (5) to instruct the line interface to receive data from the terminal.

In this situation, the status transfer logic 5 receives the status code(03) and the sub-status code(00000) from the holding circuit 4, and said status transfer logic 5 receives also the trigger code(02) from the holding circuit 4. Then, the status transfer logic 5 provides the operation code(07) according to the designated status code(03) sub-status code(00000) and the trigger code(02) (see FIG. 7). That operation code(07) is transferred to the memory 6, which outputs the content of the address(07). As shown in FIG. 8, the output of the address(07) of the memory 6 is;

| A | B | C | D | E | F | G | H | I | J | K | L | M | N |
|---|---|---|---|---|---|---|---|---|---|---|---|---|---|
| 04 | 0 | 0 | 1 | 0 | 1 | 0 | 0 | 1 | 5 | 00 | 02 | 0 | 000000 |

Those outputs of the memory 6 are kept in the holding circuit 7.

The basic processor 8-1 transfers the content of the field A to the field O in the holding circuit 9, and that field O is in turn stored in the status memory 10.

The basic processors 8-2 and 8-3 do not operate, since both the contents of the fields B and C in the holding circuit 7 are zero.

The basic processor 8-4 sets the flag R ON, since the content of the field D is 1. The flag ON condition in the field R shows that the affirmative response(the ACK code) is the DLE;NAK characters, and the negative response(the NAK code) is the DLE;ACK characters.

The basic processor 8-5 does not operate, since the content of the field E is 0.

The basic processor 8-6 sets the flag in the field T ON, since the content of the field F is 1. The flag ON condition of the field T shows that the reception data link has been established.

The basic processors 8-7 and 8-8 do not operate, since both the contents of the fields G and H are 0.

The basic processor 8-9 reads the content of the fifth upper limit in the field c, since the content of the field J is 5, and the read out result is transferred to the field d, since the content of the field I is 1. Thus, the upper limit of the time is defined by the value in the field c, and the content of the field d which is initially the same as that of the field c is decremented one by one in every predetermined period by the timer circuit 11. The timer circuit would generate the time-out trigger when the content of the field d reaches zero.

The basic processor 8-10 does not operate, since the content of the field K is '00'.

The basic processor 8-11 transfers the content of the field L to the line interface, since the content of the field L is not zero. That transferred code from the field L instructs the line interface to receive data from the terminal.

The basic processor 8-12 does not operate, since both the contents of the fields M and N are zero.

Operational Example (3)

It is assumed that the status code is (05) and the sub status code is (00001), in which the data has been received. And it is assumed that the trigger code (03) in which the host computer instructs to forward the ACK code, is received.

In this situation, the present CCU must operate (1) to change the status, (2) to set a timer, and (3) to forward the ACK code to the terminal.

In this situation, the status transfer logic 5 receives the status code(05) and the sub-status code(00001) from the holding circuit 4, and said status transfer logic 5 receives also the trigger code(03) from said holding circuit 4. Then, the status transfer logic 5 provides the operation code(0B) according to the status code(05), the sub-status code(00001), and the trigger code(03) (see FIG. 7). That operation code (0B) in hexadecimal expression is the same as (11) in decimal expression. That operation code(0B) is transferred to the memory 6, which reads out the content of the address(0B). As shown in FIG. 8, the content of the address (0B) of the memory 6 is;

| A | B | C | D | E | F | G | H | I | J | K | L | M | N |
|---|---|---|---|---|---|---|---|---|---|---|---|---|---|
| 09 | 0 | 0 | 0 | 0 | 0 | 0 | 1 | 1 | 00 | 01 | 02 | 010000 |

Those contents of the memory 6 are kept in the holding circuit 7.

The basic processor 8-1 transfers the content(09) of the field A to the field O in the holding circuit 9, and that content of the field O is in turn stored in the status memory 10. Thus, the new status code is (09).

The basic processors 8-2 through 8-6 do not operate, since the contents of the fields B through F are zero.

The basic processors 8-7 and 8-8 do not operate, since the contents of the fields G and H are zero. Therefore, the number of the repetition times is not counted.

The basic processor 8-9 reads the content of the field Y which defines the first upper limit of the time, since the content of the field J is 1. Then, the basic processor 8-9 transfers the read out content of the field Y to the field d, since the content of the field I is 1. Thus, the upper limit of the time is defined by the content of the field Y, and the content of the field d is decremented in every predetermined period by the timer circuit 11.

The basic processor 8-10 does not operate, since the content of the field K is 00.

The basic processor 8-11 transfers the content of the field L to the line interface, since the content of the field L is not zero. That code (01) in the field L means that the ACK code(DLE;ACK characters) is to be forwarded to the terminal. In this case, said code to be transmitted to the terminal is stored in the working memory, which is controlled by the basic processor 8-12.

The basic processor 8-12 forwards the content(02) of the field M, and the content(10000) of the field N to the line interface. That is to say, the basic processor 8-12 instructs to transmit two words starting from the address(10000) of the working memory. It is assumed that the working memory has the ACK code in the addresses (10000) and (10001). Thus, the ACK code is forwarded by sending the contents of the addresses (10000) and (10001).

Some modifications of the block diagram of FIG. 4 are of course possible. For instance, the status transfer logic 5 and the memory 6 can be consolidated to a single logic circuit or a single table memory, which performs the logical operation shown in FIGS. 7 and 8. The holding circuit at the output of the memory 6 can also be removed, and the outputs of the consolidated logic circuit are directly applied to the basic processors.

It should be appreciated of course that the operation of the status transfer logic shown in FIG. 7, and the operation of the memory 6 shown in FIG. 8A-FIG. 8B depend upon the given communication control procedure. The embodiment shown in FIGS. 7-8B is the example for the half duplex basic mode control procedure communication system. Other communication control procedures can be applicable to the present invention, by modifying the contents of FIGS. 7-8B.

As explained above in detail, the present invention provides a communication control unit with a very simple structure, by removing a program which is necessary in a conventional stored program type communication control unit, and a microprogram utilized in a prior microprogram type communication control unit. Further, in the present invention, a plurality of basic processors operate simultaneously and thus the process ability of the present CCU is considerably improved, that is to say, the present CCE can handle the more numbers of the lines or terminals, and/or, the higher speed lines or terminals. Further, the status memory 10 can have the area for a plurality of lines, and thus, a plurality of lines can be controlled by the present unit very simply.

Further, according to the present invention, the change of the communication control procedure is possible merely by changing the contents of the status memory 10, the status transfer logic 5 and the memory 6. Further, the present unit can handle a plurality of communication control procedures at the same time by modifying the contents of the status memory 10, the status transfer logic 5 and the memory 6.

The concept of the present invention can be applicable not only to a communication control unit, but also to other devices which operate according to the combination of a status code and a trigger code, and the cost and the steps for the design, the manufacture, the test of such devices and units can be considerably reduced, and thus, the cost performance of those devices and units can be considerably improved.

From the foregoing it will now be apparent that a new and improved communication control unit has been found. It should be understood of course that the embodiments disclosed are merely illustrative and are not intended to limit the scope of the invention. Reference should be made to the appended claims, therefore, rather than the specification as indicating the scope of the invention.

What is claimed is:

1. A communication control unit connected to a host computer and a plurality of terminals or between two host computers through communication lines including related lines having interfaces and basic processors for communication control procedures and situations comprising:

(a) a status memory having a plurality of fields for each line, the fields including at least an instantaneous status of the communication lines, information of whether a transmission data link or a reception data link has been established between the host computer and the terminals or between two host computers, a count data of the repetition times of each basic process of the communication control procedures, a predetermined upper limit value of repetition times of each basic process, a transient count data of timer pulse count fields for a timer circuit's checking of predetermined upper limit values for time over check, and predetermined upper limit values for time over check;

(b) a timer circuit for updating the content of the timer pulse count fields in the status memory in every predetermined time period value, and providing trigger data when the content of any one of the timer pulse count fields reaches its own assoicated predetermined upper limit value for time over check in the status memory;

(c) a trigger data registration circuit for storing a set of information, including trigger data comprising a trigger code and a line number, the trigger data being provided from the host computer, the lines or the timer circuit according to the kind of trigger data;

(d) a status transfer logic for providing a predetermined operation code responding to the combination of the present status code in the status memory relating to the line indicated by the line number in the trigger data and the trigger code in the trigger data provided by the trigger data registration circuit;

(e) a memory having a fixed table for decoding the output of the status transfer logic and providing an operation code for each field relating to the status memory; and (f) a plurality of basic processors operating each basic process of the communication control procedure according to the related field of the operation code provided from the memory having a fixed table and the output of the status memory and providing the outputs which are applied to the status memory, the host computer, and the related line interface, and said plurality of basic processors operating simultaneously with one another.

2. A communication control unit according to claim 1 further comprising a process control circuit which operates the timer circuit only when the status transfer logic, the memory having a fixed table and the basic processors are not operating, and operates the status transfer logic, the memory having a fixed table and the basic processors only when the timer circuit is not operating.

3. A communication control unit according to claim 1 wherein the trigger data registration circuit is implemented by a first-in-first-out memory.

4. A communication control unit according to claim 1 wherein the status transfer logic is implemented by a programmable logic array or a table memory.

5. A communication control unit according to claim 1 in which the status memory, the status transfer logic and the memory having a fixed table have changeable contents so that the communication control unit can handle a plurality of communication control procedures at the same time by modifying the contents of the status memory, the status transfer logic and the memory having a fixed table.

6. A communication control unit according to claim 5 wherein the changeable contents of the status memory include a variable upper limit value of the repeating of each of the basic processes and variable upper limit values for time over check.

7. A communication control unit according to claim 6 wherein the changeable contents of the status memory include the outputs of the basic processors which are stored in the status memory via related lines registered in the status memory, and the variable upper limit values of the repeating basic processes and the outputs of the basic processors are applied to the host computers through the communication lines which include related line interfaces.

8. A communication control unit according to claim 7 wherein at least the contents of the status memory is implemented by RAM (Random Access Memory), and at least the status transfer logic or the memory having a fixed table is implemented by the combination of AND circuits, OR circuits and NOT circuits that are responsive to a programmable logic array or RAM for modifying said changeable contents.

9. A communication control unit according to claim 8 wherein at least some of the plurality of fields in the status memory comprise a notice of repetition times over predetermined value field, a transmission side code selection field, a reception side code selection field, a transmission data link established field and a reception data link established field.

10. A communication control unit according to claim 9 wherein at least two of the plurality of fields in the status memory have counters responsive to separate fields for changing the contents of the counters.

11. A communication control unit according to claim 10 wherein at least some of the plurality of fields in the status memory comprise at least a variable repetition times counter of each basic process and its own associated predetermined upper limit value.

12. A communication control unit according to claim 11 wherein at least some of the plurality of fields in the status memory have predetermined fixed value timers including at least one variable timer and at least some of the said fields store the predetermined fixed values of the timers for the purpose of a time-over check, and at least one field in the status memory designates one of the predetermined values in at least some of the fields for a desired upper limit of the time check.

13. A communication control unit according to claim 12 wherein the predetermined fixed value timers include first, second, third, fourth and fifth upper limits for time-over check timers and at least one variable time counter.

14. A communication control unit according to claim 13 in which the timer circuit is responsive to a predetermined elapsed time period value during a timer operation mode, which is not during a trigger operation mode of the status transfer logic, the memory having a fixed table and the basic processors, and said timer operation mode is performed repetitively to all the related lines registered in the status memory.

* * * * *